United States Patent [19]

Shimozawa et al.

[11] Patent Number: 4,702,959
[45] Date of Patent: Oct. 27, 1987

[54] MAGNETIC RECORDING MEDIUM

[75] Inventors: Toru Shimozawa, Saku; Masaharu Nishimatsu, Komoro; Yoshiaki Saito, Saku, all of Japan

[73] Assignee: TDK Corporation, Tokyo, Japan

[21] Appl. No.: 841,223

[22] Filed: Mar. 19, 1986

[30] Foreign Application Priority Data

Mar. 19, 1985 [JP] Japan .................................. 60-53394
Nov. 22, 1985 [JP] Japan .................................. 60-261364

[51] Int. Cl.$^4$ .......................... G11B 5/68; G11B 5/70
[52] U.S. Cl. ........................................ 428/323; 427/44; 427/128; 427/131; 428/694; 428/900
[58] Field of Search .................. 428/694, 323, 900; 427/128, 131, 44

[56] References Cited

U.S. PATENT DOCUMENTS

| 4,451,531 | 5/1984 | Isobe et al. | 427/128 |
| 4,555,431 | 11/1985 | Miyatsuka | 427/131 |
| 4,565,726 | 1/1986 | Oguchi et al. | 428/900 |
| 4,592,942 | 6/1986 | Nishimatsu et al. | 428/900 |
| 4,596,747 | 6/1986 | Nishimatsu et al. | 427/131 |

Primary Examiner—Paul J. Thibodeau
Attorney, Agent, or Firm—Oblon, Fisher, Spivak, McClelland & Maier

[57] ABSTRACT

A magnetic recording medium comprising a non-magnetic substrate, a magnetic recording layer formed on one side of the substrate and a back coating layer formed on the other side of the substrate, characterized in that the magnetic recording layer contains a hexagonal system plate crystal magnetic powder having a particle size of at most 0.2 μm, and the back coating layer contains a binder composed of a radiation curable resin and has an electric resistance of at most $10^{10}$ Ω/cm$^2$.

4 Claims, 4 Drawing Figures

MAGNETIC RECORDING MEDIUM

BACKGROUND OF THE INVENTION

1. Field of the Invention

The present invention relates to a magnetic recording medium having a coating type magnetic recording layer wherein ferromagnetic particles are perpendicularly oriented. More particularly, the present invention relates to a magnetic recording medium wherein the magnetic recording layer contains a hexagonal system plate crystal (hexagonal plate-like) magnetic powder, and the back coating layer is composed of a certain specific binder and has an electric resistance within a specific range.

2. Description of the Prior Art

Magnetic recording media are now widely used in the fields of audio and video recording, computers, magnetic discs, etc., and they are expected to be used in the fields of video floppies, etc. Accordingly, the amount of information to be recorded on magnetic recording media increases year after year, and there is an increasing demand for the improvement of the recording density of magnetic recording media.

With respect to the magnetic recording media such as magnetic tapes, it has been common to improve the magnetic characteristics by e.g. orienting acicular magnetic particles in a magnetic recording layer in a longitudinal direction. However, those with acicular magnetic particles oriented in a longitudinal direction are not suitable for a high density recording although they are capable of obtaining a high output in a low frequency region.

For this reason, it has been recently proposed to use a magnetic recording medium wherein a plate crystal barium ferrite magnetic powder having an easily magnetizable axis in a perpendicular direction, is used for a magnetic recording layer (Japanese Unexamined Patent Publication No. 195328/1982).

However, such a medium wherein the barium ferrite magnetic powder is used, has a difficulty that erase characteristics are inferior although it is excellent in the short wavelength recording characteristics. Besides, barium ferrite has by itself an electric resistance of as high as at least $10^{16}$ $\Omega/cm^2$, and accordingly, in the case where no conductive substance such as carbon black is used in combination with barium ferrite, the magnetic recording medium is likely to adhere to the head, or is likely to adhere to a guide roller, a calender roller, etc. during the production process such as a coating process, and in an extreme case, an electric discharge noize will be generated. Therefore, it is conceivable to use a conductive substance in combination with the megnetic powder, and it is common to incorporate carbon black to reduce the electric resistance. However, as mentioned above, the electric resistance of the magnetic powder is so high that no adequate reduction of the electric resistance has been obtained by the incorporation of ordinary carbon black although it was thereby possible to reduce the electric resistance to some extent.

There is a restriction as to the amount of carbon black to be incorporated. If the amount of carbon black is excessive, magnetic characteristics, electromagnetic conversion characteristics, surface roughness, dispersibility are likely to be impaired.

In these days, magnetic discs are widely used in the fields of computers and magnetic cameras. Accordingly, the amount of information to be recorded on such magnetic discs increases year after year. As a result, there is an increasing demand for magnetic recording discs having high density recording capability.

The higher the recording density becomes, the more pronounced the problem of dropouts becomes. Namely, in the current recording system wherein a magnetic head is utilized, the spacing loss between the disc or tape and the magnetic head may be represented by 54.6 $d/\lambda$[dB] where d represents a distance between the disc and the magnetic head, and $\lambda$ represents the recording wavelength. It should be understood from this formula that in a short wavelength recording with a high recording density, the rate of reduction in the output due to spacing is significantly greater than that of a longer wavelength. Accordingly, even a small foreign matter existing on the surface of the disc or tape is inevitably detected as a dropout.

As possible causes for the dropouts, there may be mentioned the falling-off of magnetic powder from the surface of the magnetic disc coated with such powder material, which results from deterioration of the coated film due to repeated applications of stress, or the scraping-off of the supporting member during the disc running, and consequential electrostatic adhesion of the powder, dusts or the like on the surface of the supporting member, and their transfer from the supporting member onto the coated magnetic layer surface. In order to prevent these undesirable phenomena, there have been proposed various methods, for example, against the former cause, some proposals have been made to improve the toughness of the coated layer, and against the latter cause, a coating composition of carbon black, graphite or the like kneaded with an organic binder or an antistatic agent, is coated on the surface of the supporting member opposite to the magnetic surface of the magnetic disc or tape (i.e., the rear surface), thereby reducing the electrostatic phenomenon on the supporting member, or a coating composition of e.g. silicon oxide kneaded with an organic binder is coated on the surface of the supporting member in an attempt to render the supporting member to be more tenacious and thereby to reduce the abrasion of the base material.

While these treatments are effective to suppress the tendency for an increase in the dropouts by the repeated running of the discs or tapes to a remarkable extent, the level of the dropouts cannot still be said to be adequately low under the existing circumstances, and it is necessary to further reduce the dropouts.

SUMMARY OF THE INVENTION present inventors have conducted researches to overcome the above difficulties. In a magnetic recording medium, wherein the magnetic recording layer contains a hexagonal system plate crystal magnetic powder, such as a barium ferrite or strontium ferrite magnetic powder, having a particle size of at most 0.20 $\mu$m, barium ferrite or strontium ferrite by itself has an electric resistance as high as at least $10^{16}$ $\Omega/cm^2$, and the magnetic recording layer has an electric resistance of more than $10^{10}$ $\Omega/cm^2$, whereby various problems will result although the electromagnetic conversion characteristics may be improved. It has now been surprisingly found that even when the electric resistance of the magnetic recording layer is higher than $10^{10}$ $\Omega/cm^2$, it is possible to prevent the adhesion of foreign matters or dusts to the magnetic recording layer by adjusting the electric resistance of the back coating layer to a level of at most $10^{10}$ Ω/cm², whereby dropouts can be substantially reduced and a cinching phenomenon and an adhesion can be prevented. Further, it has been found that when a binder made of a radiation curable type is employed, no transfer of the roughness of the rear surface to the magnetic layer takes place and it is thereby possible to prevent dropouts; that in the case of a magnetic tape, when the Young's modulus of the back coating layer is within a specified range, the back coating surface becomes tanecious and the durability is improved whereby no abrasion due to the brittleness of the back coating layer results; and that when the surface roughness of the back coating layer is less than a certain level, it is possible to prevent deterioration of the electromagnetic conversion characteristics, to improve the abrasion resistance and to reduce the curling. The present invention has been accomplished on the basis of these discoveries.

Namely, the present invention provides a magnetic recording medium comprising a non-magnetic substrate, a magnetic recording layer formed on one side of the substrate and a back coating layer formed on the other side of the substrate, characterized in that the magnetic recording layer contains a hexagonal system plate crystal magnetic powder having a particle size of at most 0.2 μm, and the back coating layer contains a binder composed of a radiation curable resin and has an electric resistance of at most $10^{10}$ Ω/cm². From further researches, the present inventors have found it possible to further suppress the increase of dropouts by providing an undercoating layer of a conductive substance to lower the overall electric resistance of the magnetic recording layer to a level of at most $10^{10}$ Ω/cm².

BRIEF DESCRIPTION OF THE INVENTION

In the accompanying drawings, FIGS. 1 and 2 are graphs illustrating the relation between the aspect ratio and the perpendicular orientation degree of barium ferrite.

DETAILED DESCRIPTION OF THE INVENTION

Figure 1:
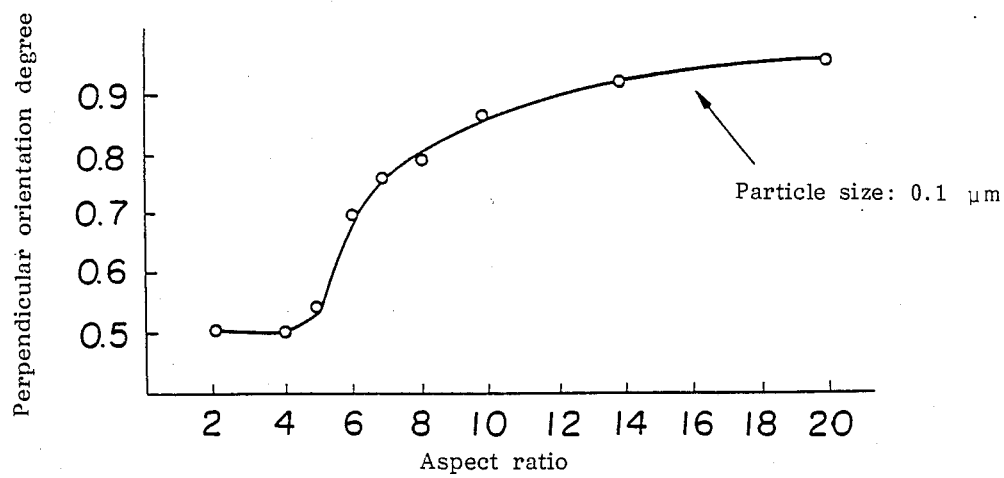

As the hexagonal system plate crystal magnetic powder to be used for the magnetic recording layer, there may be mentioned a barium ferrite magnetic powder, a strontium ferrite magnetic powder or the like.

The hexagonal system plate barium ferrite to be used for the magnetic recording layer is represented by the formula of $BaO \cdot 6Fe_2O_3$. Further, it includes a ferrite of the same formula wherein a part of Ba and Fe is replaced by a metal such as Ti, Cr, Co, Zn, In, Mn, Cu, Ge, Nb, Ca, Sr, Pb or Ni.

The barium ferrite or strontium ferrite magnetic powder has a diameter of at most 0.2 μm, preferably at most 0.15 μm, more preferably at most 0.1 μm. The aspect ratio is preferably at least 6, more preferably at least 7. The barium ferrite is hexagonal system plate crystals, and as such it gives a greater effect to the surface roughness of the resulting magnetic recording layer than an acicular magnetic powder. If the diameter is larger than the above ranage, the surface roughness tends to decrease substantially. Whereas, when the particle size is within the above-mentioned range, the perpendicular components can adequately be utilized so that the surface smoothing property of the magnetic layer will be satisfactory, whereby a noize can adequately be reduced and a high density recording can be attained.

As a method for producing barium ferrite, there may be employed a ceramic method, a co-precipitation-burning method, a hydrothermal synthetic method, a flux method, a glass crystallization method, an alkoxide method or a plasma jet method.

In the present invention, the magnetic recording layer containing a hexagonal system plate crystal magnetic powder such as a barium ferrite magnetic powder, usually has an electric resistance of more than $10^{10}$ Ω/cm² since the barium ferrite by itself has an electric resistance of as high as at least $10^{16}$ Ω/cm². If the electric resistance of the magnetic recording layer is more than $10^{10}$ Ω/cm², foreign matters or dusts are likely to deposit due to the electrostatic charge, and dropouts are likely to be brought about. On the other hand, if the electric resistance of the magnetic layer is not higher than $10^{10}$ Ω/cm², such undesirable phenomena will not result.

The first aspect of the present invention is based on the discovery that such undesirable phenomena can be prevented by adjusting the electric resistance of the back coating layer at a level of not higher than $10^{10}$ Ω/cm². In this case, the magnetic powder for the magnetic recording layer is preferably a hexagonal system plate crystal barium ferrite magntic power having a particle size of at most 0.2 μm, and an aspect ratio of at least 6.

In the second aspect of the present invention, a conductive undercoating layer is provided beneath the magnetic recording layer. It is possible to substantially suppress dropouts by reducing the electric resistance of the back coating layer (one side) alone. However, it has been found that when a conductive undercoating layer is provided beneath the magnetic recording layer, droupouts can be suppressed more completely.

The conductive undercoating layer can be obtained e.g. by incorporating a conductive substance to an undercoating layer. Any conductive substance such as carbon black, graphite or graphitized carbon black may be employed as such a conductive substance.

The carbon black may be any carbon black produced by any one of conventional methods, such as furnace, channel, acetylene, thermal or lamp. However, acetylene black, furnace black, channel black, roller and disc black and German naphthalene black are preferred. The particle size of the carbon black to be used in the present invention is not critical, but it is preferably from 10 to 100 mμm, more preferably from 10 to 80 mμm, as measured by an electron microscopic photography. If the particle size exceeds 100 mμm, the surface roughness of the undercoating layer tends to be inferior, thus leading to a deterioration of the electromagnetic conversion characteristics after the application of the magnetic layer. On the other hand, if the particle size is less than 10 mμm, the dispersion will be inadequate whereby the surface roughness of the undercoating layer will also be inferior.

As a special type of carbon black, there is graphitized carbon black. In the present invention, such graphitized carbon black may also be employed.

The graphitized carbon black has, at its surface, a shell-like structure wherein carbon layers are arranged in parallel to one another, and a void space is observed at a portion close to the interior center. Some of graphitized carbon black have a somewhat angular hollow capsule-like structure. Thus, the graphitized carbon black is different from usual carbon black in the structure, and can clearly be distinguished by means of an electron microscope. The surface shell is smooth probably because of graphitization.

The graphitized carbon black has distinguished characteristics that it has very little content of impurities such as S or Cl found in usual carbon black and the hygroscopicity is weak. The dispersibility of carbon black is usually inferior when the hygroscopicity is weak. However, in the case of the graphitized carbon black, the dispersibility is not reduced despite the low water content. The surface is graphitized to form a shell. Thus, friction is extremely low, and the hygroscopicity is weak. Therefore, those containing the graphitized carbon black, are particularly effective when used under a high temperature and high humidity condition.

Carbon black has a conductivity, and the smaller the particle size, the better the conductivity. In the graphitized carbon black, the conductivity increases as the graphitization of the crystal structure of particles proceeds. Further, volatile matters or oily components on the surface of the carbon black impair the conductivity, and it is possible to improve the conductivity by removing such volatile matters or oily components. Thus, it is advantageous to employ the graphitized carbon black also from the antistatic point of view, whereby it is possible to obtain a magnetic recording medium with minimum dropouts by using the graphitized carbon black.

The graphitized carbon black is obtained by heat-treating carbon black such as acetylene black furnace black, channel black, roller and disc black or German naphthalene black at a temperature of from 2,700° to 3,000° C., and it has an average particle size of from 10 to 100 m$\mu$m, preferably from 10 to 80 m$\mu$m, a specific surface area of from 20 to 300 m$^2$/g as measured by BET method, and a volatile matter of at most 1.0%. For instance, #4000B (tradename, manufactured by Mitsubishi Chemical Industries Ltd.) may be mentioned.

The graphitized carbon black to be used in the present invention preferably has a pH of 8 or more.

By providing such an undercoating layer, it is possible to prevent the adhesion of the medium to the magnetic head, the adhesion to a guide roller or a calender roller during the production process such as a coating process, and the discharge noize.

The thickness of the undercoating layer is preferably from about 10 Å to 3 $\mu$m.

The binder for the back coating layer according to the present invention should be composed of a radiation curable resin.

With respect to the formation of a back coating layer, if the back coating layer is formed prior to the formation of the magnetic layer, it is likely that the irregularities of the back coating layer surface will be transferred onto the magnetic layer during the surface smoothing opeation by calender treatment after the formation of the magnetic layer, and it will thereby be difficult to obtain an adequately smooth magnetic layer surface. Thus, it is usual that a magnetic layer is first formed on a supporting memeber, and then back coating treatment is applied onto the rear side of the supporting member. Since the back coating layer is required to be sufficiently tenacious so as to prevent the dropouts even when the number of running operations is increased, it is usual to employ a thermosetting resin as a binder for the back coating layer. In that case, after the application of the back coating layer, the tape will be wound up on a take-up reel and then subjected to thermosetting treatment. However, at the time when the coating has been just finished, no curing reaction has yet started in the back coating layer, and the coated layer is still weak. Yet, the back coating layer is in close contact with the magnetic layer in the rolled-up condition. Accordingly, the carbon black, graphite or other inorganic filler incorporated in the back coating layer is likely to migrate from the coated surface to the surface of the magnetic layer which is in contact with the coated surface of the back coating layer. It has been found that such migrated substance causes the dropouts or the clogging of the magnetic head. It is considered that a similar phenomenon may take place even when thermoplastic resin is used.

The present invention has been made with a view to eliminating the above-mentioned inconveniences encountered so far in the back coating layer-forming step, and aims at reducing the dropouts due to the above-mentioned causes. Namely, according to the present invention, a back coating layer is formed with a coating composition obtained by kneading a binder of a radiation sensitive resin (a resin which is curable when irradiated with radiation rays) with other inorganic additives, and then radiation rays are irradiated thereto from the active energy ray source for curing treatment, or such curing treatment is conducted after the surface treatment, thereby to form a three dimensional crosslinking in the back coating layer and thus render the coated layer strong before the tape is wound-up, whereby the dropouts can be minimized. According to this method, it is after the completion of the crosslinking reaction of the coated film that the tape is wound-up, and accordingly even if the back coating layer is in close contact with the magnetic layer as the tape is wound up, no migration from the back coating layer to the magnetic layer will take place.

Curling of the magnetic disc is another important problem. In a one-side type magnetic disc, the curling is believed to be caused by a dynamic unbalance as between the coated layer and the supporting member. Namely, the coated layer has a Young's modulus greater than the Young's modulus of the supporting member, and therefore the disc tends to flex towards the coated layer side. The curling gives adverse effects to the head touch and the running property, and therefore should be reduced as far as possible. It is conceivable that by forming a back coating layer containing carbon black, graphite or other inorganic filler on the side of the supporting member opposite to the magnetic layer so as to dynamically balance the magnetic layer, the supporting member and the back coating layer, it is possible to minimize the curling of the disc which creates problems in the heat touch and the running property. However, in the case of thermosetting binder, the thermosetting treatment is conducted in a rolled condition, whereby curling is likely to form in the direction of the roll winding, or shrinkage of the supporting member is likely to be led to increase the curling. Whereas, in the case of electron beam curable binder, the curing can be conducted on-line, whereby no problem in the case of thermosetting will be involved, and the curling can advantageously be minimized.

Thus, in the magnetic disc or tape with a magnetic layer containing a hexagonal system plate crystal magnetic powder such as a barium ferrite magnetic powder or a strontium ferrite magnetic powder on one side of the supporting member, it is possible to simultaneously solve the problem of the curling of the disc and the problem of the dropouts by forming a back coating layer, on the rear side of the supporting member, wherein a radiation sensitive curable resin is used as the binder.

The electric resistance of the back coating layer of the present invention must be at most $10^{10}$ $\Omega/cm^2$. If the electric resistance of the back coating layer is higher than $10^{10}$ $\Omega/cm^2$, adhesion of the magnetic layer and the back coating layer is likely to be led due to the frictional static charge during the running operation, and such adhesion will take place or foreign matters are likely to deposit during the assembling operation, which causes dropouts. When one side of the tape or disc has a low electric resistance, no adhesion is likely to be led. In the case of video tapes or audio tapes of a reel to reel type, abrasion of the magnetic recording layer is brought about, dropouts take place, and other magnetic characteristics are substantially impaired.

In order to reduce the electric resistance to a level of at most $10^{10}$ $\Omega/cm^2$, there may be employed a method of incorporating the following inorganic pigments: (1) conductive carbon black or graphite, or (2) an inorganic filler such as $SiO_2$, $TiO_2$, $Al_2O_3$, $Cr_2O_3$, SiC, CaO, $CaCO_3$, zinc oxide, geothite, $\alpha Fe_2O_3$, talc, kaolin, $CaSO_4$, boron nitride, fluorinated graphite, molybdenum disulfide or ZnS. Further, the following fine particulate pigments (aerosil type or colloidal type) may also be incorporated: $SiO_2$, $Al_2O_3$, $TiO_2$, $ZrO_2$, $Cr_2O_3$, $Y_2O_3$, $CeO_2$, $Fe_3O_4$, $Fe_2O_3$, $ZrSiO_4$, $Sb_2O_5$ and $SnO_2$. These fine particulate pigments have a particle size of less than 200 Å, preferably at most 150 Å. In the case of $SiO_2$, the fine particulate pigment is available in the form of (1) a colloidal solution of super-fine particles of silicic anhydride (Snowtex (trademark), an aqueous system, a methanol silica sol, etc., manufactured by Nissan Chemical Industries, Ltd.) or (2) super-fine particulate anhydrous silica (Standard product: 100 Å) produced by burning purified silicon tetrachloride (Aerosil (trademark), manufactured by Nippon Aerosil Co., Ltd.). Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments. The amount of such an inorganic pigment to be incorporated should preferably be from 20 to 200 parts by weight relative to 100 parts by weight of the binder in the case of (1) and from 10 to 300 parts by weight in the case of (2). When the amount of the inorganic pigment is too large, there will be disadvantages such that the coating film becomes brittle and the number of dropouts increases.

The radiation curable or sensitive resin to be used for the back coating layer in the present invention, is usually a resin containing at least two unsaturated double bonds in its molecular chain, which are capable of generating radicals for crosslinking when irradiated. Such a resin may also be obtained by subjecting a thermoplastic resin to radiation sensitive modification The radiation sensitive modification can be conducted, for instance, by introducing into the molecule a radiation cross-linkable or polymerizable group having a radical polymerizable unsaturated double bond such as an acrylic double bond attributable to e.g. acrylic acid, methacrylic acid or their ester compounds, an allyl-type double bond attributable to e.g. diallylphthalate, or a maleic double bond attributable to e.g. maleic acid or maleic acid derivatives. Any other radiation cross-linkable or polymerizable unsaturated double bond may likewise be employed.

Examples of the thermoplastic resins which can be modified into the radiation curable resins will be given below.

(1) Vinyl chloride type copolymers:

There may be mentioned a vinyl chloride-vinyl acetate-vinyl alcohol copolymer, a vinyl chloride-vinyl alcohol copolymer, a vinyl chloride-vinyl alcohol-vinyl propionate copolymer, a vinyl chloride-vinyl acetate-maleic acid copolymer, a vinyl chloride-vinyl acetate-vinyl alcohol-maleic acid copolymer, and a vinyl chloride-vinyl acetate-OH-terminated side chain alkyl group copolymer, such as VROH, VYNC, VYEGX, VERR, VYES, VMCA, OR VAGH manufactured by UCC (Union Carbide Corporation, U.S.A.).

These copolymers can be modified to radiation-sensitive resins by introducing into them acrylic double bonds, maleic double bonds or allyl-type double bonds by the process described later.

(2) Saturated polyester resins:

There may be mentioned saturated polyester resins obtained by the esterification of saturated polybasic acids such as phthalic acid, isophthalic acid, terephthalic acid, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. $SO_3Na$ (e.g. Vylon 53S).

These resins can be modified to radiation-sensitive resins in the same manner as above.

(3) Polyvinyl alcohol type resins:

There may be mentioned polyvinyl alcohol, butyral resins, acetal resins, formal resins, and copolymers of these components.

The hydroxyl groups contained in these resins can be modified to be radiation-sensitive by the process described hereinafter.

(4) Epoxy type resins and phenoxy resins:

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K.K.); phenoxy resins such as PKHA, PKHC and PKHH which are the highly polymerized resins among the above-mentioned epoxy resins, and are manufactured by Union Carbide Corporation; and copolymers of brominated bisphenol A with epichlorohydrin, such as EPICLON 145, 152, 153 and 1120 (manufactured by Dai-Nippon Ink & Chemicals Co.) and such resins which further contain carboxylic acid groups.

The radiation-sensitive modification is effected by utilization of the epoxy groups contained in these resins.

(5) Cellulose derivatives:

Various cellulose derivatives may be employed. Particularly effective are nitrocellulose, cellulose acetobutylate, ethyl-cellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof (e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

Further, by blending a thermoplastic elastomer or prepolymer with the above-described radiation-sensitive, modified thermoplastic resin, it is possible to make the coating film much more tenacious. Furthermore, when such an elastomer or prepolymer is likewise modified to be radiation-sensitive, a better result can be obtained, as will be described hereinbelow.

In the following, there will be given examples of the elastomers and prepolymers which may be combined with the above-described radiation-sensitive resins.

(1) Polyurethane elastomers and prepolymers:

The use of a polyurethane is particularly effective in that its abrasion resistance and the adhesion to a substrate film such as a PET film are satisfactory.

Examples of such effective urethane compounds are: polyurethane elastomers and prepolymers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; and various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, succinic acid, adipic acid, sebasic acid, and so forth), linear saturated polyethers (e.g. polyethylene glycol, polypropylene glycol, polytetramethylene glycol, and so forth) as well as caprolactum, hydroxyl-containing acrylic acid esters, hydroxyl-containing methacrylic acid esters, and so forth.

It will be highly effective to further react the terminal isocyanate group or hydroxyl group in these urethane elastomers with a monomer having an acrylic double bond, an allyl-type double bond, or the like, to thereby modify the resins to be radiation-sensitive. Further, these urethane elastomers include those containing a terminal OH, COOH, or the like, as the polar group.

(2) Elastomers of acrylonitrile-butadiene copolymers:

Prepolymers of acrylonitrile-butandiene copolymers containing therein terminal hydroxyl groups, such as "poly BD Liquid Resin" produced by Sinclair Petrochemicals Corp. and available in general market, or elastomers such as "Hycar 1432J" manufactured by Japanese Zeon K.K., and so forth are particularly suitable as the elastomeric components, with which the double bonds in butadiene produce radicals by the radiation rays to cause cross-linking and polymerization.

(3) Polybutadiene elastomers:

Low molecular weight prepolymers having the terminal hydroxyl groups, such as "Poly BD liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Further, cyclized products of polybutadiene such as "CBR-M901" manufactured by Japan Synthetic Rubber Co., also exhibit excellent performance by their combination with the thermoplastic resins.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K.K.), and elastomers such as epoxy-modified rubbers, or internally plasticized saturated linear polyesters (e.g. "Vylon #300", a product of Toyo Spinning K.K.). These may also be used effectively by subjecting them to the modifying treatment for the radiation-sensitization described hereinbelow.

Now, examples for the syntheses of the radiation curable polymers will be given.

(a) Synthesis of an acryl-modified product of a vinyl chloride-vinyl acetate copolymer type resin (radiation-sensitive modified resin):

750 Parts by weight of a partially saponified vinyl chloride-vinyl acetate copolymer (average polymerization degree, n=500) having OH groups, 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI):

348 Parts by weight of tolylene diisocyanate was heated to a temperature of 80° C. in a four-necked flask of one-liter capacity in a nitrogen ($N_2$) stream. Thereafter, 260 parts by weight of 2-ethylene methacrylate, 0.07 part by weight of tin octylate, and 0.05 part by weight of hydroquinone were added dropwise into a reaction vessel, while cooling to control the temperature inside the reaction vessel to be in a range of from 80° C. to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a butyral resin (radiation-sensitive modified resin):

100 Parts by weight of a butyral resin, "BM-S" produced by Sekisui Chemical Co., was charged into a four-necked flask of a 5-liter capacity, together with 191.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen ($N_2$) stream until the conversion of NCO reached at least 90%. After completion of the reaction, the reaction product was cooled and diluted with methyl ethyl ketone.

(c) Synthesis of an acryl-modified product of a saturated polyester resin (radiation-sensitive modified resin):

100 Parts by weight of "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen ($N_2$) stream until the conversion of NCO reached at least 90%.

(d) Synthesis of an acryl-modified product of an epoxy resin (radiation-sensitive modified resin):

400 Parts by weight of an epoxy resin, "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

Synthesis of an acryl-modified product of a phenoxy resin (radiation-sensitive modified resin):

600 Parts by weight of a phenoxy resin having OH groups, "PKHH", manufactured by UCC and 1800 parts by weight of methyl ethyl ketone were charged into a four-necked flask of a 3-liter capacity, and the mixture was heated and dissolved. After raising the temperature to 80° C., 6.0 parts by weight of a 2-hydroxyethyl methacrylate adduct of tolylene diisocyanate was added, followed by further addition of 0.012 part by weight of tin octylate and 0.012 part by weight of hydroquinone. Then, the reaction was carried out at 80° C. in a nitrogen ($N_2$) stream until the conversion of NCO reached 90%. The phenoxy-modified product had a molecular weight of 35,000 and the number of double bonds per molecule is 1.

(e) Synthesis of an acryl-modified product of a urethane elastomer (radiation-curable elastomer):

250 Parts by weight of an isocyanate-terminated diphenylmethane diisocyanate (MDI) type urethane prepolymer, "Nipporan 3119", manufactured by Nippon Polyurethane Industry Co., 32.5 parts by weight of 2HEMA, 0.07 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(f) Synthesis of an acryl-modified product of a polyether type terminal urethane-modified elastomer (radiation curable elastomer):

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the raction vessel to be in a range of from 80° to 90° C. After completion of the dropwise addition, the reaction was conducted at 80° C. until the conversion of NCO reached at least 95%.

(g) Synthesis of an acryl-modified product of a polybutadiene elastomer (radiation curable elastomer):

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside of the reaction vessel to be in a range of from 80° to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins for the backing layer, as they are, i.e. without subjecting them to any particular modifying treatment as mentioned above, since they undergo a cross-linking reaction without such treatment.

Furthermore, according to this method, even a non-solvent type resin can effectively used for the back coating, since it can be cured in a short period of time without requiring any solvent. The functional groups include a hydroxyl group of alcohol type, phenol type or phosphoric acid type, a carboxylic acid group of aromatic type or aliphatic type, a sulfonic acid group, an amine group or an ammonium group.

The particularly preferred radiation curable resin composition is a combination comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond, in the proportions of from 20 to 70% by weight of the compound (A), from 20 to 80% by weight of the compound (B) and from 10 to 40% by weight of the compound (C). By using such a combination, the breaking strength of the coating layer is increased, the coating layer is stregthened, the abrasion of the back coating layer is minimized, and no transfer of an inorganic filler powder from the back coating layer to the magnetic layer is brought about, whereby it is possible to obtain a magnetic recording medium with minimum dropouts and having uniform characteristics in a longitudinal direction, which does not lead to tightening of the winding of a rolled tape at the time of the curing operation.

Further, in the case of a thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

Whereas, in the case of a radiation curable-type resin, a continuous curing is possible, a curing time is likely to be short, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape.

With respect to the above radiation curable resin binder comprising the compounds (A), (B) and (C), if the compound (A) is employed alone, no adequate flexibility is obtainable, and the coating layer will be brittle. If the compound (B) is used alone, the coating layer lacks in the elasticity. By the combination of the compounds (A) and (B), it is possible to increase the breaking energy, but the brittleness energy can not adequately be increased. Further, when kept under a high temperature high humidity condition, the combination of compounds (A) and (B) tends to have adhesiveness and the static friction increases probably because the hardness is not adequate. Whereas, when the compounds (A) and (B) are combined with the compound (C), the degree of the cross linking increases, the tensile strength of the binder increases, the breaking energy and the brittleness energy increase, no abrasion of the back coating takes place, and a tough coating layer having high hardness is obtainable. Even when kept under a high temperature and high humidity condition at 50° C. under a relative humidity of 80% for 5 days, no adhesiveness will result, the frictional coefficient is low and no image distortion results. This is attributable to the fact that by the addition of the compound (C), the degree of the cross linking of the back coating layer increases and the degree of the hardness increases. When the compounds (A) and (B) are combined with the compound (C), the component (A) may have a lower molecular weight than the component (A) in the combination of the compounds (A) and (B) alone. Namely, by the incorporation of the component (C), the plasticity of the plastic compound (A) is improved and the degree of hardness is improved, whereby a highly elastic coating layer having a great brittleness energy is obtainable.

In the radiation curable resin binder of the present invention, if the compound (A) has a molecular weight of less than 5,000 or if the compound (B) has a molecular weight of less than 3,500, the coating layer tends to be too hard, and the back coating tends to be susceptible to abrasion, and the electromagnetic conversion characteristics tend to be poor. On the other hand, if the molecular weight of the compound (B) exceeds 100,000, the dispersibility tends to be poor, whereby the electromagnetic conversion characteristics will be inferior, and in the case where the compound (B) is radiation curable, the radiation curable property tends to be poor and the strength will be reduced. With respect to the compound (C), if the molecular weight exceeds 3,000, the cross linking property tends to be poor, and the strength of the coating layer will be low. Preferred molecular weight ranges are from 10,000 to 80,000 for the compound (A), from 3,000 to 80,000 for the compound (B) and from 200 to 2,500 for the compound (C). As the compound (B), a radiation curable compound is preferred since it is thereby possible to improve the cross linking property and the strength of the coating layer.

With respect to the proportions of the compounds (A), (B) and (C), it is preferred that the resin composition comprises from 20 to 70% by weight, preferably from 30 to 70% by weight, of the compound (A), from 20 to 80% by weight, preferably from 20 to 60% by weight, of compound (B) and from 10 to 40% by weight, preferably from 10 to 30% by weight, of the compound (C).

The molecular weights of the compounds (A), (B) and (C) of the present invention are number average molecular weights obtained by the following measuring method.

Measurement of an average molecular weight of a binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{\Sigma Ni}$$

where Mn is a number average molecular weight, and Ni is a number of molecules having a molecular weight of Mi in a given polymer substance.

In the compounds (A), (B) and (C) of the present invention, the number of unsaturated double bonds per molecule is at least 2, preferably at least 5 in the case of the compound (A), at least 1, preferably at least 5 in the case of the compound (B), and at least 1, preferably at least 3, in the case of the compound (C).

In a particularly preferred combination for the radiation curable binder composition of the present invention, the compound (A) is a compound obtained by reacting an isocyanate group-containing compound obtained by the reaction of a polyisocyanate compound with a partially saponified vinyl chloride-vinyl acetate copolymer, a carboxylic acid-introduced vinyl chloride-vinyl acetate copolymer or a phenoxy resin, with an acrylic or methacrylic compound having a functional group reactive with the isocyanate group; the compound (B) is an isocyanate compound obtained by reacting a polyol with an isocyanate compound, or a compound obtained by reacting a polyol (polyurethane elastomer) with an acrylic or methacrylic compound having a reactive functional group; and the compound (C) is a polyfunctional (meth)acrylate monomer, an oligoester acrylate or a low molecular weight compound of (B).

As the active energy rays to be used for cross-linking of the back coating layer of the present invention, there may be employed electron beams generated from a radiation accelerator as the source of radiation, $\gamma$-rays generated from $Co^{60}$ as the source of radiation, $\beta$-rays generated from $Sr^{90}$ as the source of radiation, X-rays generated from an X-ray generator as the source of radiation or ultraviolet rays.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the back coating layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the curing of the back coating layer according to the present invention, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating appratus.

Further, for the cross-linking by radiation, it is important to irradiate the back coating layer with the radiation rays in an inert gas stream such as nitrogen ($N_2$) gas, helium (He) gas, and so forth. It is extremely disadvantageous to conduct the radiation in the air because $O_3$, etc. generated by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 5% at the maximum.

In the magnetic recording medium, in the case of a disc type or a reel winding type such as a magnetic tape, the back coating layer is required to have an electric resistance of at most $10^{10} \Omega/cm^2$ and a Young's modulus E' of from 200 to 1500 kg/mm$^2$, and in the case of reel winding type, the surface roughness is required to be at most 0.20 $\mu$m at a cut off of 0.17 mm by R20.0 (20 point average method).

E' (Young's modulus) can optionally be adjusted by a conductive filler, an inorganic filler or a back coating resin, and the surface roughness can be varied by the particle size of a conductive filler or an inorganic filler and a dispersing method. The dispersing method can be varied by the dipersing agent, the dispersing machine or the dispersing time.

If E' (Young's modulus) is less than 200 Kg/mm$^2$, the breaking strength tends to poor, and in the case of a reel winding type, the abrasion of the back coating layer will result during the running operation for durability test. On the other hand, if it is more than 1500 Kg/mm$^2$, the back coating layer will be too hard and the magnetic layer tends to be abraded. Such is undesirable also in the case of the disc type, since the abrasion results at the time of a running operation after coating, a winding-up operation and an assembling operation. In the case of the reel winding type, if the surface roughness of the back coating layer is higher than 0.20 $\mu$m at a cut off of 0.17 mm by 20 point average method, electromagnetic conversion characteristics tend to deteriorate and the cinching phenomenon, the abrasion of the back coating layer and the adhesion are likely to result, whereby the number of dropouts increases.

For the magnetic recording layer of the present invention, there may be employed thermoplastic resins, thermosetting resins or reactive resins, or mixtures thereof, which are commonly used for the magnetic recording media. However, from the viewpoint of the strength of the formed coating layer, a thermosetting type resin, particularly a radiation curable type resin, is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diaceate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol coplymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture. Particularly preferred is a combination comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond, in the proportions of from 20 to 70% by weight of the compound (A), from 20 to 80% by weight of the compound (B) and from 10 to 40% by weight of the compound (C).

The molecular weights of the oligomers and polymers of the compounds (A), (B) and (C), are number average molecular weights obtained by the same measuring method as mentioned above with respect to the back coating layer.

It is advantageous to use a radiation curable resin, since the curing time is short and there will be no transfer of e.g. fillers from the back coating surface to the magnetic layer after the winding up operation. Whereas, in the case of thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

The curing agent to be used for the thermosetting resin in the present invention may be any curing agent which is commonly used for thermosetting resins of this type. Particularly preferred is an isocyanate-type curing agent. For instance, there may be mentioned Kryspon 4565 and 4560 manufactured by Dai-Nippon Ink & Chemicals Co., Colonate L manufactured by Nippon Polyurethane Industry Co. and Takenate XL-1007 manufactured by Takeda Chemical Industries, Ltd.

As an undercoating layer, it has been proposed to provide a non-magnetic primer coating layer on the film substrate to improve the adhesive strength. Various thermoplastic resins or thermosetting resins have been employed as the resin binder for the formation of the primer coating layer. In the case where a thermoplastic resin primer is used, there is a problem such that when a magnetic coating material containing a substantial amount of a solvent, is applied, it is likely that the previously formed primer coating layer is swelled or dissolved by the solvent, whereby the coating will be uneven and the smoothness of the magnetic layer will be lost. In the case where a thermosetting resin primer is employed, the above problem may be avoided, but there is an industrial disadvantage that the heat-curing treatment requires a long period of time, whereby it is impossible to continuously form the magnetic layer. Further, the adhesion may take place between the undercoating layer and the base film at the time of thermosetting. Therefore, the useful resins were limited, and it was impossible to use a resin which caused a tack. Further, it may happen that the surface of the undercoating layer is roughened due to the adhesion or the tightening of the winding. Thus, it is preferred to employ a radiation curable resin.

The above-mentioned problem in the primer treatment of the magnetic recording medium, can be solved by using a predetermined radiation curable resin as the binder for forming the primer coating layer. Namely, it is thereby possible to adequately prevent electrostatic charge by the treatment for a short period of time, to form a primer coating layer having excellent solvent resistance and adhesion, and to continously coat the magnetic layer to obtain a magnetic recording medium having excellent surface smoothness, electric characteristics and mechanical strength.

Namely, in a magnetic recording medium prepared by applying a non-magnetic primer coating layer on a substrate, followed by the formation of a magnetic layer, the above-mentioned effect can be attained by a magnetic recording medium wherein the primer coating layer is formed by applying radiation to a radiation curable coating material such as a coating material comprising one or more oligomers or polymers containing at least two (meth)acryloyl groups, each having a molecular weight of at least 200 and, if necessary, a solvent or a photopolymerization initiator.

When coated on a substrate and irradiated, such a primer coating material instantaneously undergoes cross-linking and forms a coating layer having a three-dimensional network structure. The coating layer thus formed, does not undergo swelling even when contacted with a solvent at the time of the application of the magnetic layer, whereby it is possible to maintain the smoothness of the magnetic layer.

In short, the present invention provides a magnetic recording medium having a low electrostatic property, excellent surface smoothness and good adhesion of the magnetic layer by using, as the primer coating layer, a dispersion of a conductive substance such as carbon black in a radiation curable coating material composed of molecules containing radiation sensitive (radiation curable) double bonds.

The conductive material is dispersed only in the primer coating layer and not in the magnetic layer. Nevertheless, the surface resistance of the magnetic layer is substantially reduced by the presence of the primer coating layer, whereby it is possible to minimize the electrostatic charge and the consequential problems such as sticking of the tape or the dropouts, and it is possible to overcome a problem that the tape winding appearance deteriorates during the use or during the process for the production. Furthermore, because of the presence of the undercoating layer, the adhesive strength is improved and it is thereby to possible to prevent the magnetic layer from falling off even when a strong stress is applied to the tape instantaneously.

As the organic binder for the undercoating layer, the same organic binders as for the above-mentioned back coating layer and the magnetic layer, such as the above thermoplastic resins, the thermosetting resins and the radiation curable resins may be employed. However, the radiation curable resins are preferred.

As specific examples of the radiation curable resin, there may be mentioned a resin, an elastomer, an oligomer, a polymer and a monomer which contains in its molecule of a thermoplastic resin or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. Any other compounds having a radiation cross-linkable or polymerizable unsaturated double bond may likewise be employed.

It is preferred to use a compound containing at least two (meth)acryloyl groups per molecule, the molecular weight being at least 200 per each acryloyl group. If the molecular weight per (meth)acryloyl group is less than 200, the resin component tends to undergo a substantial volumetric shrinkage at the time of the crosslinking (curing) reaction, whereby the substrate will be curled, thus leading to poor dimensional stability and deterioration of the adhesion of the undercoating layer.

Among low molecular weight monomers, there are many compounds having low boiling points, which tend to evaporate during the drying and curing operation, and are likely to create an industrial problem. However, even such low molecular monomers may provide excellent properties when used in combination with a resin component having a high molecular weight.

In the case where two or more radiation curable oligomers or polymers are used in combination, it is particularly advantageous to employ a radiation curable coating material containing at least two components selected from the group consisting of the following (A), (B) and (C):

(A) a compound containing at least two radiation curable unsaturated double bonds and having a molecular weight of at least 5000, preferably at least 8000;

(B) a compound containing at least one radiation curable unsaturated double bond and having a molecular weight of at least 400 and less than 5000, preferably from 600 to 3000; and (C) a compound containing at least one radiation curable unsaturated double bond and having a molecular weight of less than 400.

It is particularly preferred that the radiation curable coating material comprises at least two components selected from the groups (A), B) and (C) in the respective proportions of from 0 to 90% by weight of (A), from 0 to 80% by weight of (B) and from 0 to 50% by weight of (C). Further, it is also possible to employ a radiation curable coating material comprising (A) and (B) in the respective proportions of from 20 to 95% by weight of (A) and from 5 to 80% by weight of (B). The radiation curable coating material may contain from 1 to 10% by weight of a photosensitizer for photopolymerization.

As resins containing radiation cross linkable or polyemrizable groups in the molecule of a thermoplastic resin, there may be mentioned the following unsaturated polyester resin.

Namely, there may be mentioned a polyester compound containing radiation curable unsaturated double bonds in its molecular chain, such as an unsaturated polyester resin containing radiation curable unsaturated double bonds, which is prepared by substituting maleic acid for a part of polybasic acids in a saturated polyester resin comprising an ester bond of a polybasic acid with a polyhydric alcohol, as mentioned above in the item (2) with respect to the back coating layer. A radiation curable unsaturated polyester resin may be prepared by a conventional method by an addition of e.g. maleic acid or fumaric acid to at least one polybasic acid component and at least one polyhydric alcohol component, i.e. by subjecting the mixture to a dehydration or alcohol removal reaction in the presence of a catalyst at a temperature of from 180 to 200° C. in a nitrogen atmosphere, then raising the temperature to from 240 to 280° C. and conducting a condensation reaction under a reduced pressure of from 0.5 to 1 mmHg. The content of maleic acid or fumaric acid is from 1 to 40 mol%, preferably from 10 to 30 mol% in the acid component, in view of the cross linking at the time of the production and the radiation curable property.

As examples of the thermoplastic resins which can be modified into the radiation curable resins, there may be mentioned the same resins as described above with respect to the back coating layer.

As examples of the elastomers and prepolymers which may be combined with the above-described radiation-sensitive resins, there may be mentioned the same elastomers and prepolymers as described above with respect to the back coating layer.

Besides, there may be mentioned a reaction product obtained by reacting one molecule of a compound having at least one hydroxyl group per molecule with one isocyanate group of at least one molecule of a polyisocyanate compound, followed by the reaction with at least one molecule of a monomer containing a group reactive with an isocyanate group and a radiation curable unsaturated double bond, i.e. a resin, prepolymer, oligomer or telomer having two acrylic double bonds at the terminals of the molecule, which is obtained by reacting 2 mols of toluene diisocyanate with 1 mol of a bifunctional polyether obtained by the addition of propylene oxide to propylene glycol (Adeka Polyether P-1000, manufactured by Asahi Denka Kogyo K. K.), followed by the reaction with 2 mols of 2-hydroxyethyl methacrylate.

As the compound containing at least one hydroxyl group to be used here, there may be mentioned a polyfunctional ether such as Adeka Polyether P-700, P-1000 or G-1500 (manufactured by Asahi Denka Kogyo K. K.), or Polymeg 1000 or 650 (manufactured by Quaker Oats Co.); and such resins which are further modified with e.g SO₃Na (e.g. Vylon 53S).

Further, cyclized products of polybutadiene such as "CBR-M901" manufactured by Japan Synthetic Rubber Co., also exhibit excellent performance by their combination with the thermoplastic resins.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K. K.), and elastomers such as epoxy-modified rubbers, or internally plasticized saturated linear polyesters (e.g. "Vylon #300", a product of Toyo Spinning K. K.). These may also be used effectively by subjecting them to the modifying treatment for the radiation-sensitization described hereinbelow.

As such monomer and oligomer, there may be mentioned styrene, ethyl acrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, N-vinyl pyrrolidone, pentaerythritol tetraacrylate (or methacrylate), pentaerythritol triacrylate (or methacrylate), trimethylol propane triacrylate (or methacrylate), trimethylol propane diacrylate (or methacrylate), an acrylate (or methacrylate) of a phenol ethylene oxide adduct, or compounds of the following formula in which a pentaerythritol condensed ring is substituted by an acryl radical (or a methacryl radical) or an ε-caprolactone-acryl radical:

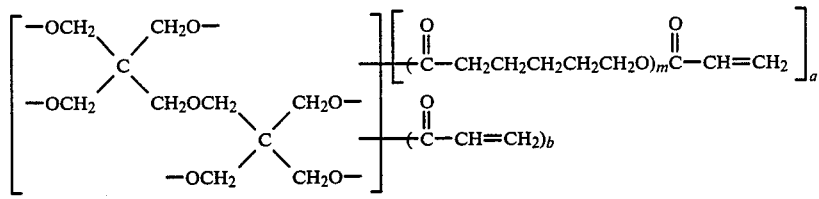

i.e. a compound wherein m=1, a=2 and b=4 (which will be hereinafter referred to as "special pentaerythritol condensation product A"), a compound wherein m=1, a=3 and b=3 (which will be hereinafter referred to as "special pentaerythritol condensation produce B"), a compound wherein m=1, a=6 and b=0 (which is hereinafter referred to as "special pentaerythritol condensation product C"), a compound wherein m=2, a=6 and b=0 (which will be hereinafter referred to as "special pentaerythritol condensation product D"), and special acrylates represented by the following formulas:

(Special Acrylate A)

(Special Acrylate B)

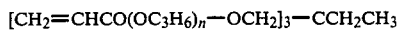

(n ≈ 3)     (Special Acrylate C)

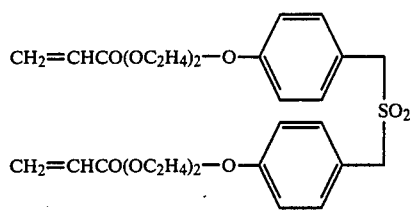

(Special Acrylate D)

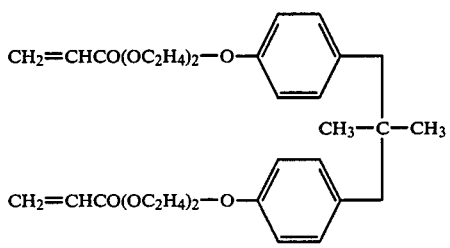

(Special Acrylate E)

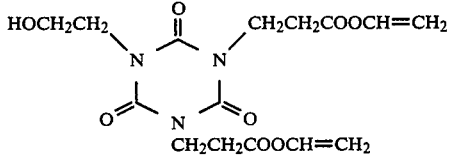

(Special Acrylate F)

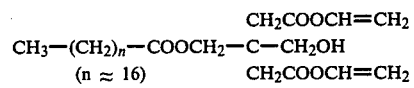

(n ≈ 16)

(Special Acrylate G)

CH₂=CHCOO—(CH₂CH₂O)₄—COCH=CH₂     (8)

(Special Acrylate H)

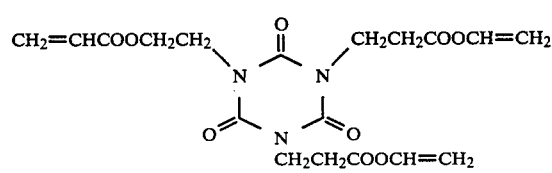

(Special Acrylate I)

-continued

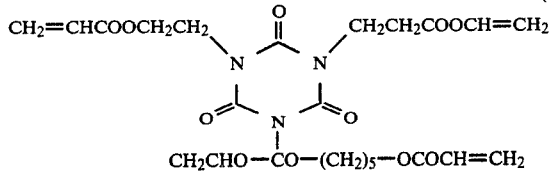

(10)

(Special Acrylate J)

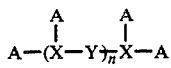

(11)

A: acrylic acid, X: polyhydric alcohol,

Y: polybasic acid (Special Acrylate K)

As the compound having radiation curable unsaturated double bonds to be used in the present invention, there may be mentioned styrene, ethyl acrylate, ethylene glycol di(meth)acrylate, diethylene glycol di(meth)acrylate, 1,6-hexaneglycol di(meth)acrylate, trimethylol propane tri(meth)acrylate, a multifunctional oligoester acrylate (Acronix M-7100, manufactured by Toa Gosei Chemical Industries Co. Ltd.), etc.

For the syntheses of the radiation curable binder polymers, reference should be made to the examples as described above with respect to the back coating layer.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins for the undercoating layer, as they are, i.e. without subjecting them to any particular modifying treatment as mentioned above, since they undergo a cross-linking reaction without such treatment.

Furthermore, according to this method, even a nonsolvent type resin can effectively be used for the undercoating, since it can be cured in a short period of time without requiring any solvent.

The radiation curable coating material in the present invention is obtainable by using the above-mentioned compounds. The compound containing an acrylic double bond and having a molecular weight of at least 400, may be used alone. However, in such a case, as the molecular weight increases, the electron beam-curing property tends to decrease in connection with the density of the functional groups, whereby a higher radiation dose will be required, and the heat resistance tends to be poor as the curing property decreases. Further, in some cases, the adhesion of the undercoating layer tends to be impaired as the curing property increases.

On the other hand, in the case of an electron beam-curable resin having a molecular weight of less than 400, there will be a problem in the adhesion of the undercoating layer, although the electron curing property, the solvent resistance and the heat resistance will be improved. Thus, when a compound containing an acrylic double bond and having a molecular weight of at least 400 or less than 400, is used alone, it is rather difficult to obtian a undercoating material which satisfies various requirements in a well-balanced condition for various characteristics required for a magnetic recording medium.

Whereas, it is readily possible to obtain satisfactory adhesion and curing property by a combination of at least two compounds having different molecular weights.

Other additives which are commonly used, such as inorganic pigments, lubricants, dispersing agents or antistatic agents, may be incorporated in the magnetic recording layer, the undercoating layer and the back coating layer of the present invention in a usual manner.

As the inorganic pigments, those mentioned above with respect to the back coating layer may be employed also for the magnetic recording layer and the undercoating layer.

The amount of the inorganic pigment to be incorporated is also as mentioned above. If the amount is too much, the undercoating layer or the magnetic recording layer tends to be brittle as in the case of the back coating layer. In the case of the undercoating layer, adverse effects of the brittleness such as the adhesion to a guide pole which in turn causes adhesion to the magnetic layer, the abrasion of the undercoating layer leading to a deterioration of the surface roughness and an increase of dropouts, are likely to appear during the processing. In the case of the magnetic layer, the brittleness brings about practical problems.

As the lubricant, there may be mentioned e.g. silicone oil, fluorine oil, a fatty acid, a fatty acid ester, a paraffin, a liquid paraffin or a surfactant which has been commonly used as a lubricant for the back coating layer of this type. However, it is particularly preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid. Further, metallic soaps of the above-mentioned aliphatic acids with alkali or alkaline earth metals and lecithin may also be used.

As the silicone, there may be employed a fatty acid-modified silicone or a partially fluorinated silicone. As the alcohol, there may be employed a higher alcohol. As the fluorine oil, there may be employed those produced by electrolytic substitution, telomerization or oligomerization.

Among the lubricants, radiation curable type lubricants may be advantageously employed to prevent the transfer of the roughness of the rear side to the ferromagnetic thin layer or to reduce dropouts or the difference in the output as between the outside and the inside of the roll of a rolled tape, and to make the production on-line possible. Such radiation curable lubricants include compounds containing in their molecules molecular chains exhibiting lubricating properties and acrylic double bonds, such as acrylates, methacrylates, vinyl acetates, acrylic acid amide compounds, vinyl alcohol esters, methyl vinyl alcohol esters, allyl alcohol esters and glycerides. These lubricants may be represented by the following structural formulas:

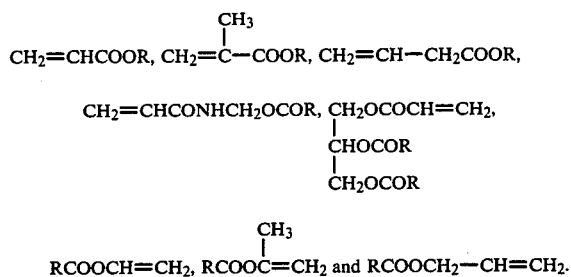

In the above formulas, R is a straight chain or branched, saturated or unsaturated hydrocarbon group having at least 7 carbon atoms, preferably from 12 to 23 carbon atoms, which may be substituted by fluorine. As the fluorinated substituents, there may be mentioned

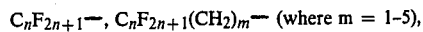

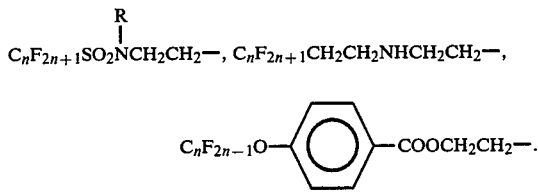

Preferred specific examples of such radiation curable lubricants include stearic acid methacrylate or acrylate, methacrylate or acrylate of stearyl alcohol, methacrylate or acrylate of glycerin, methacrylate or acrylate of glycol, and methacrylate or acrylate of silicone.

If no lubricant is incorporated, the back coating layer will have a high frictional coefficient, whereby flickering of the image or jitters are likely to be brought about. Further, since the frictional coefficient is especially high under a high temperature running condition, abrasion of the magnetic recording layer is likely to be led, and the tape winding tends to be irregular.

As the dispersing agent, there may be employed an organic titanium coupling agent, a silane coupling agent or a surfactant. As the antistatic agent, there may be employed a conductive fine powder such as carbon black; a natural surfactant such as saponin; a nonionic surfactant such as an alkylene oxide-type, a glycerin-type or a glycidol-type; a cationic surfactant such as a higher alkyl amine, a quaternary ammonium, pyridine or other heterocyclic compounds, phosphonium or a sulfonium; an anionic surfactant containing acid groups such as carboxylic acid groups, sulfonic acid groups, sulfate groups or phosphate groups; or an amphoteric surfactant such as an amino acid, an amino sulfonic acid or a sulfuric acid or phosphoric acid ester of an amino alcohol.

With respect to the proportion of the conductive substance in the undercoating layer of the present invention, carbon black is suitably incorporated in an amount of from 5 to 200 parts by weight relative to 100 parts by weight of the binder.

With respect to the mixing ratio of the barium ferrite magnetic powder and the organic binder, the weight ratio of the barium to the binder is usally from 1/1 to 9/1, preferably from 2/1 to 8/1.

Other additives are incorporated in an amount of from 0.1 to 20 parts by weight in a usual manner.

The thicknesses of the magnetic recording layer, the undercoating layer and the back coating layer of the present invention are usually within a range of from 0.1 to 10 $\mu$m, respectively.

As a solvent for the application of the magnetic recording layer, the undercoating layer and the back coating layer, there may be employed a ketone such as acetone, methyl ethyl ketone, methyl isobutyl ketone or cyclohexanone; an alcohol such as methanol, ethanol, propanol or butanol; an ester such as methyl acetate, ethyl acetate, butyl acetate, ethyl lactate or acetic acid glycol monoethyl ether; a glycol ether such as ether, glycol dimethyl ether, glycol monoethyl ether or dioxane; an aromatic hydrocarbon such as benzene, toluene or xylene; a chlorinated hydrocarbon such as methylene chloride, ethylene chloride, carbon tetrachloride, chloroform, ethylene chlorohydrin or dichlorobenznene; and tetrahydrofuran and dimethylformamide.

As the non-magnetic substrate to be used in the present invention, there may be employed a polyester such as polyethylene terephthalate, a polyolefin such as polypropylene, a cellulose derivative such as cellulose triacetate, a polyimide, a polycarbonate, a polysulfone, a polyethylene naphthalate, an aromatic aramide, an aromatic polyester, aluminum or glass. However, the useful substrate is not restricted to the above specific examples. Particularly preferred are a polyester and a polyimide.

As the radiation rays to be used for cross-linking or curing of the radiation curable coating composition of the present invention, there may be employed electron beams generated from a radiation accelerator as the source of radiation, $\alpha$-rays generated from $Co^{60}$ as the source of radiation, $\beta$-rays generated from $Sr^{90}$ as the source of radiation, X-rays generated from an X-ray generator as the source of radiation or ultraviolet rays.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the magnetic coating layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

A photosensitizer may be incorporated into the radiation curable coating material of the present invention to make it suitable for ultraviolet curing. As such a photosensitizer, there may be employed conventional sensitizers, for example, a benzoin type sensitizer such as benzoin methyl ether, benzoin ethyl ether, $\alpha$-methyl benzoin or $\alpha$-chlorodeoxybenzoin; a ketone such as benzophenone or an acetophenone bisdialkylaminobenzophenone; a quinone such as anthraquinone or phenanthraquinone; or a sulfide such as benzyl disulfide or tetramethylthiuram disulfide. The photosentisizer is used in an amount of from 0.1 to 10% by weight relative to the resin solid content.

The magnetic recording medium of the present invention may be produced by a usual manner. For instance, a mixed dispersion comprising a magnetic powder, a binder and other additives is applied on the non-magnetic substrate or on the undercoating layer, and while drying the dispersion, it is exposed to the perpendicular orientation magnetic field to perpendicularly orient magnetic particles. Immediately thereafter, the binder is subjected to curing or cross-linking to obtain a desired magnetic recording medium.

A top coating layer may be provided, as the case requires.

As the typical orientation method, there may be employed a permanent magnet, a direct current magnetic field and an alternating current magnetic field. Further, various combinations thereof may also be employed such as a combination of a perpendicular orientation with a horizontal orientation, a combination of a permanent magnet or a direct current magnetic field with an alternating current magnetic field, a mechanical orientation, or a combination of a mechanical orientation with the above combinations.

It is necessary to conduct the drying operation in the magnetic field so that the oriented magnetic particles will not be disturbed or disoriented due to the diamagnetic field outside the magnetic field. Namely, it is necessary to dry them in the magnetic field so that the magnetic particles will be prevented from mobilization even when the diamagnetic field is applied thereto.

Now, the present invention will be described in further detail with reference to Examples and Comparative Examples. However, it should be understood that the present invention is by no means restricted by these specific Examples.

(1) Formation of magnetic layers

Magnetic layer 1 (radiation curable-type magnetic layer)

|  | Parts by weight |
| --- | --- |
| Barium ferrite<br>(diameter: 0.1 μm, thickness:<br>0.01 μm, Hc: 800 Oe) | 120 |
| α-Al$_2$O$_3$ powder (0.5 μm, particulate) | 2 |
| Solvent (MEK/toluene: 50/50) | 100 |

The mixture having the above composition was mixed in a ball mill for 3 hours to adequately wet the hexagonal system plate crystal barium ferrite.

Then, the following binder composition was thoroughly mixed and dissolved.

|  | Parts by weight |
| --- | --- |
| Vinyl chloride-vinyl acetate-vinyl alcohol copolymer (containing maleic acid) having a molecular weight of 40,000 | 6 (as solid content) |
| Acrylic double bond-introduced vinyl chloride-vinyl acetate copolymer (containing maleic acid) having a molecular weight of 20,000 | 12 (as solid content) |
| Acrylic double bond-introduced polyether urethane elastomer having a molecular weight of 40,000 | 9 (as solid content) |
| Pentaerythritol triacrylate | 3 |
| Solvent (MEK/toluene: 50/50) | 200 |
| Stearic acid | 4 |
| Butyl stearate | 2 |

The binder mixture was introduced into the ball mill wherein the magnetic powder was previously treated, and the mixture was again mixed and dispersed for 42 hours.

The magnetic coating material thus obtained was applied onto a polyester film having a thickness of 33 μm, and perpendicularly oriented on a parmanent magnet (3000 gauss) while drying it. After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

From FIG. 1, it is evident that the perpendicular orientation degree changes as the aspect ratio of the hexagonal system plate crystal barium ferrite in Magnetic layer 1 is changed. When the aspect ratio is less than 6, the perpendicular orientation degree is inadequate. On the other hand, when the aspect ratio is more than 6, the perpendicular orientation is readily obtainable.

From FIG. 1, it is evident that the particle size is preferably at most 0.1 μm in respect of electromagnetic conversion characteristics. However, it is possible to employ the one having a particle size of at most 0.2 μm from a practical point of view.

TABLE 1

| Particle size (μ/m) | C/N |
| --- | --- |
| 0.30 | −8 |
| 0.20 | −3 |
| 0.15 | −2 |
| 0.10 | 0 |
| 0.08 | +0.2 |
| 0.07 | +0.4 |

Magnetic layer 2 (thermosetting-type magnetic layer)

|  | Parts by weight |
| --- | --- |
| Barium ferrite magnetic powder<br>(diameter: 0.1 μm, thickness:<br>0.015 μm, Hc: 1000 Oe) | 120 |
| α-Al$_2$O$_3$ powder (0.5 μm, particulate) | 2 |
| Dispersant (purified soybean lecithin) | 3 |
| Solvent (MEK/toluene: 50/50) | 100 |

The mixture having the above composition was mixed in a ball mill for 3 hours to adequately wet the hexagonal system plate crystal barium ferrite with the dispersant.

Then, the following was thoroughly mixed and dissolved.

|  | Parts by weight |
| --- | --- |
| Vinyl chloride-vinyl acetate copolymer (VAGH, manufactured by Union Carbide Co.) | 15 |
| Thermoplastic urethane resin (Nippolan 3022, manufactured by Nippon Polyurethane Industry Co.) | 15 |
| Solvent (MEK/toluene: 50/50) | 200 |
| Lubricant (higher fatty acid-modified silicone oil) | 3 |

The mixture thus obtained was introduced into the ball mill wherein the magnetic powder was treated, and the mixture was dispersed again for 42 hours. After the dispersing, 5 parts by weight (as solid content) of an isocyanate compound (Desmodule L, manufactured by Bayer AG) reactive and cross-linkable with functional groups composed mainly of hydroxyl groups of the binder in the magnetic coating material, was mixed with the above coating material in the ball mill for 20 minutes.

The magnetic coating material thus prepared was applied onto a polyester film having a thickness of 33 μm, perpendicularly oriented on an alternating current magnetic field (3000 gauss), and the solvent was evaporated by means of an infrared lamp or hot air. Then, the coated film was subjected to surface smoothing treatment, and then kept in a rolled state in an oven maintained at 80° C. for 48 hours to promote the cross linking reaction by the isocyanate.

(2) Formation of back coating layers

Comparative back coating layer (thermosetting type)

The following mixture was thoroughly mixed and dissolved.

| | Parts by weight |
|---|---|
| Carbon Black, 30 mμm | 50 |
| Curing agent: Colonate L | 20 |
| Lubricant: | |
| Stearic acid-modified silicone | 4 |
| Butyl stearate | 2 |
| Nitrocellulose: | 40 |
| Vinyl chloride-vinyl acetate-vinyl alcohol copolymer (S-lec A manufactured by Sekisui Plastics Co., Ltd.) | 30 |
| Polyurethane elastomer (Essen 5703 manufactured by B. F. Goodrich Co.) | 30 |
| Solvent mixture (MIBK/toluene) | 250 |

The coating material thus prepared was applied onto a polyester film and the solvent was evaporated by means of an infrared lamp or hot air. Then, the coated film was subjected to surface smoothing treatment, and then kept in a rolled state in an oven maintained at 80° C. for 48 hours to promote the crosslinking reaction by the isocyanate.

Back coating layer 1

| | Parts by weight |
|---|---|
| Graphitized carbon black #400B (30 mμm) | 50 |
| (A) Acryl-modified vinyl chloride-vinyl acetate-vinyl alcohol copolymer having a molecular weight of 45,000. | 50 |
| (B) Acryl-modified polyurethane elastomer having a molecular weight of 20,000. | 50 |
| Stearic acid | 2 |
| Butyl stearate | 2 |
| Solvent mixture (MIBK/toluene = 1/1) | 300 |

The mixture having the above composition was dispersed in a ball mill for five hours, and the dispersed mixture was coated on the rear surface of the polyester film, on which a magnetic layer had already been formed, in such a manner that the thickness of the back coating layer upon drying would be 1 μm. Then, this back coating layer was irradiated with electron beams in a nitrogen ($N_2$) gas by means of an electron curtain type electron beam accelerator at an accelerating voltage of 150 KeV, at an electrode current of 10 mA, and at an absorption dose of 5 Mrad.

Back coating layer 2

| | Parts by weight |
|---|---|
| Carbon black, 20 mμm | 50 |
| Acryl-modified vinyl chloride-vinyl acetate-vinyl alcohol copolymer having a molecular weight of 30,000 | 40 |
| Acryl-modified polyurethane elastomer having a molecular weight of 20,000 | 40 |
| Polyfunctional acrylate having a molecular weight of 1,000 | 20 |
| Stearic acid | 4 |
| Butyl stearate | 2 |
| Solvent (MEK/toluene) | 250 |

The above mixture was treated in the same manner as for the production of Back coating layer 1.

Back coating layer 3

| | Parts by weight |
|---|---|
| $CaCO_3$, 80 mμm | 25 |
| Carbon black, 30 mμm | 25 |
| Acryl-modified vinyl chloride-vinyl acetate-vinyl alcohol copolymer having a molecular weight of 30,000 | 30 |
| Acryl-modified polyurethane elastomer having a molecular weight of 50,000 | 30 |
| Acryl-modified phenoxy resin having a molecular weight of 35,000 | 20 |
| Polyfunctional acrylate having a molecular weight of 500 | 20 |
| Stearic acid | 4 |
| Solvent (MEK/toluene = 1/1) | 300 |

The above mixture was treated and applied in the same as above.

The characteristics of the respective layers are shown in Table 2.

TABLE 2

| Layer (Type) | Electric resistance ($\Omega/cm^2$) | Running operation without back coating layer | Surface roughness (μm) | E' ($kg/mm^2$) |
|---|---|---|---|---|
| Magnetic layer 1 (Radiation curable) | $5 \times 10^5$ | Electric discharge noise was generated during the operation. Foreign matters and dusts deposited. | | |
| Magnetic layer 2 (Thermosetting) | $1 \times 10^{16}$ | Electric discharge noise was generated during the operation. Foreign matters and dusts deposited. | | |

TABLE 2-continued

| Layer (Type) | Electric resistance ($\Omega/cm^2$) | Running operation without back coating layer | Surface roughness ($\mu m$) | E' ($kg/mm^2$) |
|---|---|---|---|---|
| | | Irregular winding of the jumbo roll took place. Base was abraded. | | |
| Back coating layer 1 (Radiation curable) | $1 \times 10^7$ | | 0.09 | 800 |
| Back coating layer 2 (Radiation curable) | $2 \times 10^7$ | | 0.09 | 1300 |
| Back coating layer 3 (Radiation curable) | $3 \times 10^8$ | | 0.09 | 1200 |
| Comparative back coating layer (Thermosetting) | $2 \times 10^7$ | | 0.11 | 800 |

With respect to the magnetic recording medium prepared by the combination of the above magnetic layer 1 and back coating layer 2, the ratio of the pigment to the binder in the back coating layer was changed to adjust its E' (Young's modulus), electric resistance and roughness of the back coating layer, whereby the changes of the respective characteristics were examined. The results are shown in Tables 3 and 4. In Table 3, a coating was made on a substrate film having a thickness of 33 $\mu m$. In Table 4, a coating was made on a substrate film having a thickness of 11 $\mu m$, and a 8 m/m deck was used for evaluation.

curling was minimized and there was no practical problem.

Then, magnetic recording media were prepared by an appropriate combination of the above magnetic layers 1 and 2 with the above comparative back coating layer and back coating layers 1, 2 and 3 by changing the order of the formation of the layers. Calender treatment was applied at the time of the formation of each layer. The characteristics of the recording media were measured, and the results are shown in Tables 5 and 6. In Table 5, coating was made on a substrate film having a thickness of 33 $\mu m$. In Table 6, coating was made on a substrate

TABLE 3

| | | | Back coating layer | | | | Adhesion to the guide poles and | |
|---|---|---|---|---|---|---|---|---|
| No. | Pigment | Binder | E' ($kg/mm^2$) | Electric resistance | Roughness of the back coating surface ($\mu m$) | Abrasion of the back coating layer during the running operation | Winding appearance during the running operation | adhesion of foreign matters during the running operation | Pressed scars on the magnetic surface side |
| 1 | 20 | 100 | 100 | $6 \times 10^{10}$ | 0.18 | X | X | X | X$^-$ |
| 2 | 25 | 100 | 250 | $3 \times 10^{10}$ | 0.12 | Δ | Δ | O | Δ |
| 3 | 33 | 100 | 400 | $5 \times 10^9$ | 0.10 | O | O | O | O |
| 4 | 50 | 100 | 800 | $4 \times 10^8$ | 0.08 | O | O | O | O |
| 5 | 100 | 100 | 1300 | $1 \times 10^8$ | 0.10 | O | O | O | O |
| 6 | 200 | 100 | 1300 | $1 \times 10^8$ | 0.10 | O | O | O | O |
| 7 | 250 | 100 | 500 | $4 \times 10^8$ | 0.08 | O | O | O | Δ |
| 8 | 300 | 100 | 150 | $2 \times 10^9$ | 0.30 | X | X | X | X |

(Substrate: 33 $\mu m$)

TABLE 4

| No. | Dropouts | Abrasion of the back coating layer | Winding appearance | Electromagnetic conversion characteristics C/N |
|---|---|---|---|---|
| 1 | 1500 | X | X | −2.9 |
| 2 | 200 | Δ | Δ | −0.5 |
| 3 | 80 | O | O | 0 |
| 4 | 70 | O | O | 0 |
| 5 | 80 | O | O | 0 |
| 6 | 80 | O | O | 0 |
| 7 | 80 | O | O | −0.4 |
| 8 | 800 | X | X | −2.8 |

From Tables 3 and 4, it is evident that satisfactory results are obtainable over all the characteristics for those (No. 3–No. 7) wherein the magnetic layer has the electric resistance of more than $10^{10}$ $\Omega/cm^2$ and the back coating layer has an electric resistance of at most $10^{10}$ $\Omega/cm^2$, E' of from 200 to 1500 $kg/mm^2$ and the surface roughness of at most 0.20 at a cut off of 0.17 mm by 20 point average method.

Particularly in the case of a disc type, when no back coating layer was provided, a substantial curling occured and it was impossible to practically use it. Whereas, when a back coating layer was provided, film having a thickness of 11 $\mu m$ In the Tables, (1) and (2) indicate the order of the formation of the magnetic layer and the back coating layer.

TABLE 5

| | Magnetic layer | Back coating layer | C—S/N (dB) Outside | Inside |
|---|---|---|---|---|
| Comparative | (1) Magnetic layer 2 | (2) Comparative back coating layer | +0.2 | −2.5 |
| | (2) Magnetic layer 2 | (1) Comparative back coating layer | +0.2 | −2.0 |
| A | (1) Magnetic layer 2 | (2) Back coating layer 2 | +0.3 | −0.7 |
| B | (2) Magnetic layer 2 | (1) Back coating layer 2 | +0.3 | −0.3 |
| C 1 | (1) Magnetic layer 1 | (2) Back coating layer 1 | +0.6 | +0.6 |
| 2 | (2) Magnetic layer 1 | (1) Back coating layer 2 | +0.6 | +0.6 |
| 2 | (1) Magnetic layer 1 | (2) Back coating layer 2 | +0.6 | +0.6 |

TABLE 6

| | Abrasion of the back coating layer | Abrasion of the magnetic layer | Winding appearance | C—S/N Outside | C—S/N Inside |
|---|---|---|---|---|---|
| Comparative | ○ | ○ | △ | +0.2 | −0.5 |
| A | ○ | ○ | ○ | +0.3 | −0.7 |
| B | ○ | ○ | ○ | +0.3 | −0.3 |
| C 1 | ○ | ○ | ○ | +0.6 | +0.6 |
| 2 | ○ | ○ | ○ | +0.6 | +0.6 |
| 3 | ○ | ○ | ○ | +0.6 | +0.6 |

(Substrate: 11 μm)

From Tables 5 and 6, it is evident that in the case where at least one of the magnetic layer and the back coating layer is made of a radiation curable type (A, B), no transfer of the roughness of the rear side to the magnetic layer takes place as contast to the case where both the magnetic layer and the back coating layer are made of a thermosetting type (Comparative Example), and accordingly dropouts are reduced and the output increases. In the case where both the magnetic layer and the back coating layer are made of a radiation curable type (C), a superior result is obtainable in respect of e.g. the electromagnetic conversion characteristics. From the comparison of groups A, B and C with Comparative Example, it is evident that in the case of groups A, B and C, no adverse effect due to the tightening of the tape winding is brought about, and the difference in the electromagnetic conversion characteristics as between the outside and the inside the rolled tape, is reduced. Such a tendency also applies to the case where C is superior to A, B. Further, in the case of group C, the curing is conducted continuously during the running operation, whereby no adverse effect due to the tightening of the tape winding is brought about.

The above tapes have minimum friction since a fatty acid is incorporated in the coated film, and thus they are excellent without fluctuation of image under a high temperature running operation.

Figure 2:
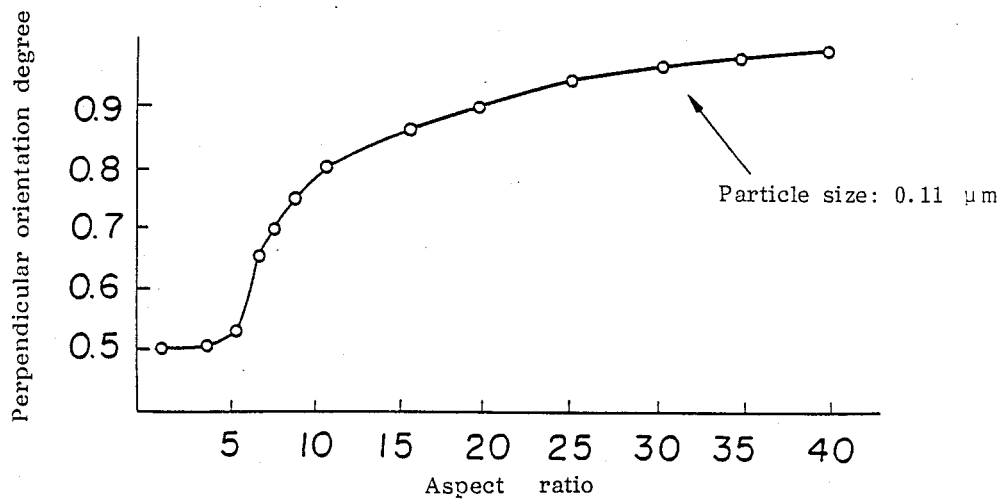

Then, the surface roughness of the video tapes obtained in Table 5 was studied. FIG. 2 shows the relation between the surface roughness of the magnetic layer and the C/N ratios (dB) with respect to a tape wherein a combination of the magnetic layer 1 with the back coating layer 2, a substrate thickness of 33 μm, a particle size of barium ferrite of 0.08 μm, and a plate crystal thickness of 0.01 μm, were employed. Namely, FIG. 2 shows the S/N ratios (relative values) in the case where the video tapes were driven at a speed of 3.8 m/sec, and the recording and reproduction were conducted by RF signals with a major frequency of 7 MHz. As is evident from the Figure, the S/N ratio can be kept at a high level when the surface roughness of the magnetic layer is at most 0.08 μm. The same applies to the case of other combinations.

Figure 3:
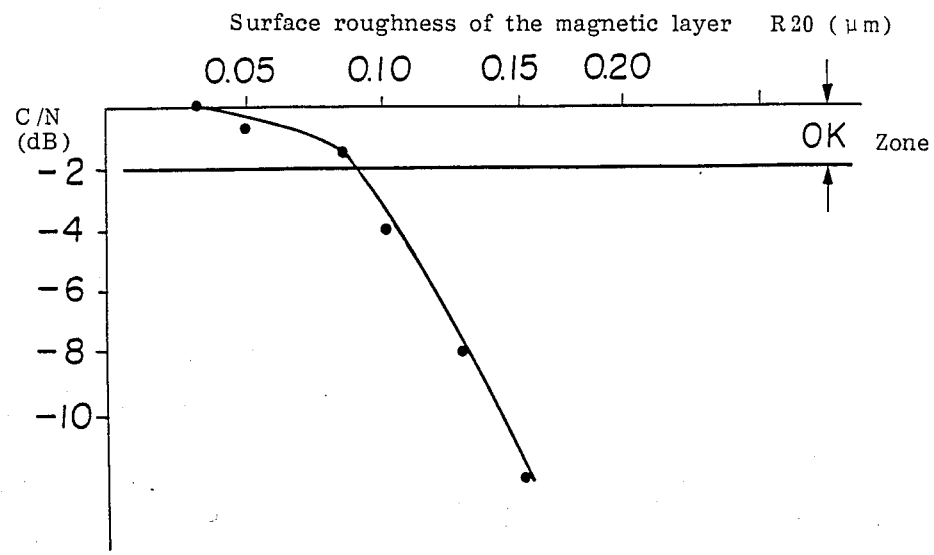
FIG. 3 is a graph illustrating the relation between the surface roughness of the magnetic layer of a magnetic recording medium and the C/N ratio.
Figure 4:
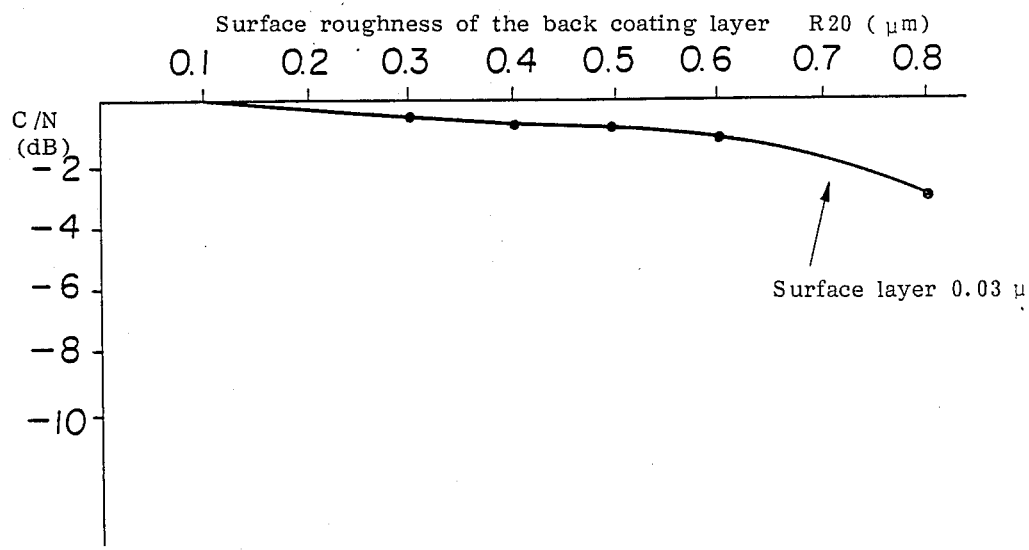
FIG. 4 is a graph illustrating the relation between the surface roughness of the back coating layer and the C/N ratio.

With respect to the above video tapes wherein the surface roughness of the magnetic layer was at most 0.08 μm and the surface roughness of the back coating layer was within a range of from 0.05 to 0.6 μm, the test results as shown in FIG. 3 were obtained.

Further, the tightening of the tape winding was measured, and at 40° C. under a relative humidity of 80%, satisfactory results were obtained in all cases.

Undercoating layer 1

| | Parts by weight |
|---|---|
| Carbon black, 20 mμm | 50 |
| (A) Acryl-modified vinyl chloride-vinyl acetate-vinyl alcohol copolymer having a molecular weight of 45,000. | 50 |
| (B) Acryl-modified polyurethane elastomer having a molecular weight of 5,000. | 50 |
| Stearic acid | 2 |
| Butyl stearate | 2 |
| Solvent mixture (MIBK/toluene = 1/1) | 300 |

The mixture having the above composition was dispersed in a ball mill for five hours, and the dispersed mixture was coated on a polyester film having a thickness of 33 μm, in such a manner that the thickness of the undercoating layer upon drying would be 0.7 μm. Then, this undercoating layer was irradiated with electron beams in a nitrogen (N₂) gas by means of an electron curtain type electron beam accelerator at an accelerating voltage of 150 KeV, at an electrode current of 10 mA, and at an absorption dose of 5 Mrad.

Undercoating layer 2

| | Parts by weight |
|---|---|
| Graphitized carbon black #4000B (30 mμm) | 50 |
| Acryl-modified vinyl chloride-vinyl acetate-vinyl alcohol copolymer having a molecular weight of 30,000. | 40 |
| Acryl-modified polyurethane elastomer having a molecular weight of 20,000. | 40 |
| Polyfunctional acrylate having a molecular weight of 1,000 | 20 |
| Myristic acid | 4 |
| Solvent mixture (MIBK/toluene) | 250 |

The above mixture was treated in the same manner as or the production of the undercoating layer 1.

Undercoating layer 3

| | Parts by weight |
|---|---|
| Carbon black, 30 mμm | 60 |
| SiO₂ (by method (2)), 50 mμm | 40 |
| Phenoxy acrylate-modified product having a molecular weight of 30,000 | 20 |
| Acryl-modified polyurethane elastomer having a molecular weight of 30,000. | 50 |
| Trimethylolpropane | 20 |
| Oleic acid | 4 |
| Methacrylate stearate | 2 |
| Solvent mixture (MIBK/toluene = 1/1) | 300 |

The above mixture was treated in the same manner as for the production of the undercoating layer 1.

Comparative undercoating layers

Comparative undercoating layers 1, 2 and 3 were prepared in the same manner as for the undercoating layers 1, 2 and 3, respectively, except that no carbon black was incorporated.

Magnetic layer 3 (thermosetting-type magnetic layer)

|  | Parts by weight |
| --- | --- |
| Barium ferrite magnetic powder (diameter: 0.11 μm, thickness: 0.015 μm, Hc: 950 Oe) | 120 |
| α-Al$_2$O$_3$ powder (0.5 μm, particulate) | 2 |
| Dispersant (purified soybean lecithin) | 3 |
| Solvent (MEK/toluene: 50/50) | 100 |

The mixture having the above composition was mixed in a ball mill for 3 hours to adequately wet the hexagonal system plate crystal barium ferrite with the dispersant.

Then, the following mixture was thoroughly mixed and dissolved.

|  | Parts by weight |
| --- | --- |
| Vinyl chloride-vinyl acetate copolymer (VAGH, manufactured by Union Carbide Co.) | 15 |
| Thermoplastic urethane resin (Nippolan 3022, manufactured by Nippon Polyurethane Industry Co.) | 15 |
| Solvent (MEK/toluene: 50/50) | 200 |
| Lubricant (higher fatty acid-modified silicone oil) | 3 |

The mixture thus obtained was introduced into the ball mill where the magnetic powder was treated, and the mixture was dispersed again for 42 hours. After the dispersing, 5 parts by weight (as solid content) of an isocyanate compound (Desmodule L, manufactured by Bayer AG) reactive and cross linkable with functional groups composed mainly of hydroxyl groups of the binder in the magnetic coating material, was mixed with the above coating material in the ball mill for 20 minutes.

The magnetic coating material thus prepared was applied, in a thickness of 3 μm, onto an undercoating layer formed on a polyester film having a thickness of 33 μm, perpendicularly oriented on a permanent magnet (3000 gauss) while drying it, and the solvent was evaporated by means of an infrared lamp or hot air. Then, the coated film was subjected to surface smoothing treatment, and then kept in a rolled state in an oven maintained at 80° C. for 48 hours to promote the cross linking reaction by the isocyanate.

From FIG. 2, it is evident that the perpendicular orientation degree changes as the aspect ratio of the hexagonal system plate crystal barium ferrite in the magnetic layer 3 is changed. When the aspect ratio is less than 6, the perpendicular orientation degree is inadequate. On the other hand, when the aspect ratio is more than 6, the perpendicular orientation is readily obtainable.

From FIG. 7, it is evident that the particle size is preferably at most 0.1 μm in respect of electromagnetic conversion characteristics. However, it is possible to employ the one having a particle size of up to 0.2 μm from a practical point of view.

TABLE 7

| Particle size (μ/m) | C/N |
| --- | --- |
| 0.30 | −8 |
| 0.20 | −3 |
| 0.15 | −2 |

TABLE 7-continued

| Particle size (μ/m) | C/N |
| --- | --- |
| 0.10 | 0 |
| 0.08 | +0.2 |
| 0.07 | +0.4 |

Magnetic layer 3'

Magnetic layer 3' was prepared in the same manner as for Magnetic layer 3 except that 5 parts by weight of carbon black (20 mμm) was further added to the component of the magnetic layer 3.

Magnetic layer 4 (radiation curable-type magnetic layer)

|  | Parts by weight |
| --- | --- |
| Barium ferrite (diameter: 0.1 μm, thickness: 0.01 μm, Hc: 800 Oe) | 120 |
| α-Al$_2$O$_3$ powder (0.5 μm, particulate) | 2 |
| Solvent (MEK/toluene: 50/50) | 100 |

The mixture having the above composition was mixed in a ball mill for 3 hours to adequately wet the hexagonal system plate crystal barium ferrite.

Then, the following binder composition was thoroughly mixed and dissolved.

|  | Parts by weight |
| --- | --- |
| Vinyl chloride-vinyl acetate-vinyl alcohol copolymer (containing maleic acid) having a molecular weight of 40,000 | 6 (as solid content) |
| Acrylic double bond-introduced vinyl chloride-vinyl acetate copolymer (containing maleic acid) having a molecular weight of 20,000 | 12 (as solid content) |
| Acrylic double bond-introduced polyether urethane elastomer having a molecular weight of 40,000 | 9 (as solid content) |
| Pentaerythritol triacrylate | 3 |
| Solvent (MEK/toluene: 50/50) | 200 |
| Stearic acid | 4 |
| Butyl stearate | 2 |
| Solvent (MEK/Toluene 50/50) | 200 |

The binder mixture was introduced into the ball mill wherein the magnetic powder was previously treated, and the mixture was again mixed and dispersed for 42 hours.

The magnetic coating material thus obtained was applied onto an undercoating layer formed on a polyester film having a thickness of 33 μm, and prependicularly oriented on a parmanent magnet (3000 gauss) while drying it. After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

Magnetic layer 4'

The electric resistance of the entire magnetic layer is $3 \times 10^7$ $\Omega/cm^2$.

TABLE 9

| No. | Pigment | Binder | E' (kg/mm²) | Electric resistance | Roughness of the back coating surface (μm) | Abrasion of the back coating layer during the running operation | Winding appearance during the running operation | Adhesion to the guide poles and adhesion of foreign matters during the running operation | Pressed scars on the magnetic surface side |
|---|---|---|---|---|---|---|---|---|---|
| 1 | 20 | 100 | 100 | $6 \times 10^{10}$ | 0.18 | X | X | X | X |
| 2 | 25 | 100 | 250 | $3 \times 10^{10}$ | 0.12 | ○ | ○ | ⊙ | Δ |
| 3 | 33 | 100 | 400 | $5 \times 10^9$ | 0.10 | ⊙ | ⊙ | ⊙ | ○ |
| 4 | 50 | 100 | 800 | $4 \times 10^8$ | 0.08 | ⊙ | ⊙ | ⊙ | ○ |
| 5 | 100 | 100 | 1300 | $1 \times 10^8$ | 0.10 | ⊙ | ⊙ | ⊙ | ○ |
| 6 | 200 | 100 | 1300 | $1 \times 10^8$ | 0.10 | ⊙ | ⊙ | ⊙ | ○ |
| 7 | 250 | 100 | 500 | $4 \times 10^8$ | 0.08 | ⊙ | ⊙ | ⊙ | Δ |
| 8 | 300 | 100 | 150 | $2 \times 10^9$ | 0.30 | X | X | X | X |
| Comparative 2 | | | | | | Δ | Δ | Δ | Δ |

(Note)
Comparative 2: The same as No. 2 except that the comparative undercoating layer 1 was used. (Substrate: 33 μm)

Magnetic layer 4' was prepared in the same manner, as for the magnetic layer 4 except that 5 parts by weight of graphitized carbon black (#4000B) was further added to the component of the magnetic layer 4.

Each of the above magnetic layers is combined with each of the undercoating layer, as shown in Table 8.

The characteristics of the respective layers are shown in Table 8.

TABLE 8

| Layer | (Type) | Electric resistance (Ω/cm²) | Running operation without back coating layer |
|---|---|---|---|
| Magnetic layer 3 | (Radiation curable) | $1 \times 10^9$ | Electric discharge noise was generated during the operation. |
| (Undercoating layer 1) | | | Foreign matters and dusts deposited. Irregular winding of the jumbo roll took place. Base was abraded. |
| Magnetic layer 4 | (Thermosetting) | $1 \times 10^{16}$ | Electric discharge noise was generated during the operation. |
| (Comparative undercoating layer) | | | Foreign matters and dusts deposited. Irregular winding of the jumbo roll took place. Base was abraded. |

With respect to the magnetic recording medium prepared by the combination of the above magnetic layer 3, the undercoating layer 1 and the back coating layer 2, the ratio of the pigment to the binder in the back coating layer was changed to adjust its E' (Young's modulus), electric resistance and the roughness of the back coating surface, whereby the changes of the respective characteristics were examined. The results are shown in Tables 9 and 10. In Table 9, a coating was made on a substrate film having a thickness of 33 μm. In Table 10, a coating was made on a substrate film having a thickness of 11 μm and a 8 m/m deck was used for evaluation.

TABLE 10

| No. | Dropouts | Abrasion of the back coating layer | Winding appearance | Electromagnetic conversion characteristics C/N |
|---|---|---|---|---|
| 1 | 1500 | X | X | −2.9 |
| 2 | 100 | ○ | ○ | −0.5 |
| 3 | 40 | ⊙ | ⊙ | 0 |
| 4 | 40 | ⊙ | ⊙ | 0 |
| 5 | 40 | ⊙ | ⊙ | 0 |
| 6 | 40 | ⊙ | ⊙ | 0 |
| 7 | 40 | ⊙ | ⊙ | −0.4 |
| 8 | 700 | X | X | −2.8 |

From Tables 9 and 10, it is evident that satisfactory results are obtainable over all the characteristics for those (No. 2-No. 7) wherein the magnetic layer has the electric resistance of at most $10^{10}$ $\Omega/cm^2$ and the back coating layer has the electric resistance of at most $10^{10}$ $\Omega/cm^2$, E' of from 200 to 1500 kg/mm² and the surface roughness of at most 0.20 μm at a cut off of 0.17 mm by 20 point average method.

Particularly in the case of a disc type, it was impossible to use those having no back coating layer since the curling occured substantially. Whereas, when a back coating layer was provided, curling was minimized and thus there was no practical problem.

Then, magnetic recording media were prepared by an appropriate combination of the above magnetic layers 3, 4, 3' and 4' with the undercoating layers 1, 2 and 3 and the back coating layers 1, 2 and 3 and the comparative back coating layer by changing the order of the formation of the layers. Calender treatment was applied at the time of the formation of each layer. The characteristics of the recording media were measured, and the results are shown base film having a thickness of 33 μm. In Table 12, coating was made on a base film having a thickness of 11 μm. In the Tables, (1) and (2) indicate the order of the formation of the magnetic layer, the undercoating layer and the back coating layer.

TABLE 11

| | Magnetic layer side | Back coating side | C—S/N (dB) Outside | C—S/N (dB) Inside | Electric resistance of the magnetic layer side |
|---|---|---|---|---|---|
| Comparative | (1) Magnetic layer 3' + Undercoating layer 2 | (2) Comparative back coating | +0.2 | −2.5 | $2 \times 10^7$ |

TABLE 11-continued

| | Magnetic layer side | | | Back coating side | | C—S/N (dB) Outside | C—S/N (dB) Inside | Electric resistance of the magnetic layer side |
|---|---|---|---|---|---|---|---|---|
| | (2) Magnetic layer 3' | + | Undercoating layer 2 | (1) Comparative back coating layer | | +0.2 | −2.0 | $2 \times 10^7$ |
| A | (1) Magnetic layer 3' | + | Undercoating layer 2 | (2) Back coating layer 2 | | +0.3 | −0.7 | $1 \times 10^7$ |
| B | (2) Magnetic layer 3' | + | Undercoating layer 2 | (1) Back coating layer 2 | | +0.3 | −0.3 | $1 \times 10^7$ |
| C 1 | (1) Magnetic layer 4' | + | Undercoating layer 1 | (2) Back coating layer 1 | | +0.6 | +0.6 | $2 \times 10^7$ |
| 2 | (2) Magnetic layer 4' | + | Undercoating layer 2 | (1) Back coating layer 2 | | +0.6 | +0.6 | $1 \times 10^7$ |
| 3 | (1) Magnetic layer 5 | + | Undercoating layer 3 | (2) Back coating layer 3 | | +0.6 | +0.6 | $1 \times 10^9$ |
| 4 | (2) Magnetic layer 4 | + | Undercoating layer 2 | (1) Back coating layer 2 | | +0.6 | +0.6 | $1 \times 10^9$ |

TABLE 12

| | Abrasion of the back coating layer | Abrasion of the magnetic layer | Winding appearance | C—S/N Outside | C—S/N Inside | Dropouts |
|---|---|---|---|---|---|---|
| Comparative | ⊚ | ⊚ | Δ | +0.2 | −2.5 | 300 |
| A | ⊚ | ⊚ | ⊚ | +0.3 | −0.7 | 65 |
| B | ⊚ | ⊚ | ⊚ | +0.3 | −0.3 | 55 |
| C 1 | ⊚ | ⊚ | ⊚ | +0.6 | +0.6 | 40 |
| 2 | | | | +0.6 | +0.6 | 40 |
| 3 | ⊚ | ⊚ | ⊚ | +0.6 | +0.6 | 35 |
| Comparative C 1 | ⊚ | ⊚ | ⊚ | +0.6 | +0.6 | 120 |
| | ○ | ○ | ○ | | | |

(Substrate: 11 μm)

From Tables 11 and 12, it is evident that in the case where at least one of the magnetic layer and the back coating layer is made of a radiation curable type (A, B), no transfer of the roughness of the rear side to the magnetic layer takes place as contast to the case where both the magnetic layer and the back coating layer are made of a thermosetting type (Comparative Example), and accordingly dropouts are reduced and the output is increased. In the case where both the magnetic layer and the back coating layer are made of a radiation curable type (C), a superior result is obtainable in respect of e.g. the electromagnetic conversion characteristics. From the comparison of groups A, B and C with Comparative Example, it is evident that in the case of groups A, B and C, no adverse effect due to the tightening of the tape winding is brought about, and the difference in the electromagnetic conversion characteristics as between the outside and the inside the rolled tape, has been reduced. Such a tendency also applies to the case where C is superior to A, B. Further, in the case of group C, the curing is conducted continuously during the running operation, whereby no adverse effect due to the tightening of the tape winding is brought about.

Comparative C 1 is the case where no conductive substance is incorporated in the undercoating layer. The media of the present invention have a lower electric resistance than the comparative C 1, and thus the abrasion of the back coating layer and the abrasion of the magnetic layer are minimized, and the winding apperance and dropouts are improved.

The above tapes have minimum friction since a fatty acid is incorporated in the coated film, and thus they are excellent without fluctuation of image under a high temperature running operation.

According to the first aspect of the present invention, in a magnetic recording medium comprising a magnetic recording layer containing a hexagonal system plate crystal barium ferrite magnetic powder and a back coating layer, the binder for the back coating layer is made of a radiation curable resin and the electric resistance of the back coating layer is at most $10^{10}$ Ω/cm². According to the second aspect of the present invention, in a magnetic recording medium comprising a magnetic recording layer containing a hexagonal system plate crystal barium ferrite magnetic powder and a back coating layer, a conductive undercoating layer is provided beneath the magnetic recording layer, the overall electric resistance of the magnetic recording layer side is at most $10^{10}$ Ω/cm², the binder of the back coating layer is made of a radiation curable resin and the electric resistance of the back coating layer is at most $10^{10}$ Ω/cm². Accordingly, it is possible to obtain an excellent magnetic recording medium with minimum dropouts, which is free from the deposition of foreign matters and dusts, the transfer of the rear side to the magnetic layer, the cinching phenomenon and the adhesiveness and which has satisfactory short wavelength recording characteristics due to a hexagonal system plate crystal magnetic powder such as a barium ferrite magnetic powder. Accordingly, in the case of a magnetic disc, no curling takes place. In the case of a magnetic tape, when the Young's modulus of the back coating layer is from 200 to 1500 kg/mm² and the surface roughness of the back coating layer is at most 0.20 μm at a cut off of 0.17 mm by 20 point average method, the durability of the back coating layer will increase, and no abrasion will be led, and the abrasion resistance will be improved whereby it is possible to obtain a magnetic tape having excellent electromagnetic conversion characteristics.

A perpendicularly oriented magnetic recording medium is suitable for use as the magnetic recording medium as compared with an in-plane orientation recording medium since a diamagnetic field is hardly generated, and thus the excellent magnetic recording medium of the present invention is suitable for a high density recording medium such as a digital audio tape, a floppy disc or a video floppy.

The above-mentioned various characteristics were measured or evaluated as follows:

1. Running operation

A tape wherein a coating was applied on a substrate film of 33 μm, was permitted to run at a tape speed of 200 m/min. via 50 guide poles during the running operation, whereby the abrasion of the back coating layer, the winding appearance of the jumbo roll, the adhesion to guide poles and the deposition of foreign matters were tested.

2. Electromagnetic conversion characteristics (1) Video floppy

The C-S/N ratio (relative value) when the recording and reproduction were conducted by RF signals at a major frequency of 7MHz, is shown. The rotational speed was 3600 rpm and the relative speed was 0.6 m/sec.

(2) 8 m/m

The C-S/N ratio (relative value) when the recording and reproduction were conducted with a 8 m/m deck at a major frequency of 7MHz, is shown. The relative speed was 3.8 m/sec.

3. Winding appearance of the 8 m/m deck

By means of a 8 m/m deck, a tape was fast forwarded for the entire length and then fast rewound and stopped when the rest of the length was 50 m, and then fast rewound to the end of the tape. Then, the winding condition of the tape was visually observed. Good winding where no space was observed in the tape winding, was designated by ◯, and inferior winding where a space was observed in the tape winding, was designated by x.

4. Abrasion of the back coating layer by 8 m/m deck

By means of a commercialy available 8 m/m deck, a tape was permitted to run 50 times, whereupon the stain inside the cassette case was observed. Symbol ◯ indicates that no stain was observed, and symbol x indicates that substantial stains were observed.

5. Young's modulus of elasticity

The Young's modulus was measured at 20° C. by an elasticity spectro meter (Iwaki Seisakusho, Toyo Boardwin, Toyo Seikosha).

6. Surface roughness

The surface roughness was obtained by 20 point average method from the chart obtained by means of Talystep (manufactured by TAYLOR-HOBSON CO.). A cut off of 0.17 mm and a needle-pressure of $0.1 \times 2.5$ μ were employed.

What is claimed is:

1. A magnetic recording medium, comprising a non-magnetic substrate, a magnetic recording layer formed on one side of said substrate and a back coating layer formed on the other side of said substrate, wherein said magnetic recording layer contains a hexagonal system plate crystal magnetic powder having a particle size of at most 0.2 micron, and wherein said back coating layer comprises a binder comprised of a radiation curable resin, wherein said back coating layer has an electrical resistance of at most $10^{10}$ Ω/cm$^2$, and wherein said back coating layer has E' of from 500-1500 kg/mm$^2$ and a surface roughness of at most 0.20 micron as measured at a cutoff of 0.17 mm by the 20 point average method.

2. The magnetic recording medium according to claim 1, wherein the magnetic powder is a hexagonal system plate crystal barium ferrite magnetic powder having an aspect ratio of at least 6 and the magnetic recording layer has an electric resistance of more than $10^{10}$ Ω/cm$^2$.

3. The magnetic recording medium according to claim 1, wherein the magnetic recording layer is provided with a conductive undercoating layer so that the overall electric reisistance at the magnetic recording layer side is at most $10^{10}$ Ω/cm$^2$.

4. The magnetic recording medium according to claim 3, herein the hexagonal system plate crystal magnetic powder is a barium ferrite powder.

* * * * *